(12) United States Patent
De Castro et al.

(10) Patent No.: US 7,433,400 B2
(45) Date of Patent: Oct. 7, 2008

(54) CONCURRENT PROCESS FOR BLIND DECONVOLUTION OF DIGITAL SIGNALS

(75) Inventors: Fernando Cesar Comparsi De Castro, Viamao (BR); Maria Cristina Felippetto De Castro, Viamao (BR); Dalton Soares Arantes, Campinas (BR)

(73) Assignee: Uniao Brasileira De Educacao E Assistencia, Porto, Alegre, RS (BR)

( * ) Notice: Subject to any disclaimer, the term of this patent is extended or adjusted under 35 U.S.C. 154(b) by 0 days.

(21) Appl. No.: 11/622,869

(22) Filed: Jan. 12, 2007

(65) Prior Publication Data

US 2007/0189374 A1  Aug. 16, 2007

Related U.S. Application Data

(63) Continuation of application No. 10/469,628, filed as application No. PCT/BR02/00030 on Mar. 2, 2002, now abandoned.

(30) Foreign Application Priority Data

Mar. 2, 2001  (BR)  .................................... 0101198

(51) Int. Cl.
    *H03K 5/159*  (2006.01)

(52) U.S. Cl. ...................................................... 375/232
(58) Field of Classification Search ................ 375/229, 375/231, 232, 233; 708/3, 5, 322, 323; 379/406.08, 379/406.09, 406.01, 406.11, 406.1; 342/151
See application file for complete search history.

(56) References Cited

U.S. PATENT DOCUMENTS 5,999,567 A * 12/1999 Torkkola ..................... 375/232

OTHER PUBLICATIONS

Tugnait "Adaptive Blind Deconvolution of M.I.M.O. Channels Using Higher-order Statistics" 1998 IEEE, p. 468-472.*
Loubaton et al. Blind deconvolution of multivariate signals: a deflation approach, IEEE, 1993, p. 1160-1164.*
Torkkola, Blind Deconvolution, Information Maximization and Recursive Filters IEEE, 1997, p. 3301-3304.*

* cited by examiner

*Primary Examiner*—Sam K Ahn
(74) *Attorney, Agent, or Firm*—Laurence P. Colton; Smith, Gambrell & Russell

(57) ABSTRACT

A process and system for eliminating intersymbol interference in digital signals, which is caused by the dispersive effect of any practical transmission channel.

7 Claims, 32 Drawing Sheets

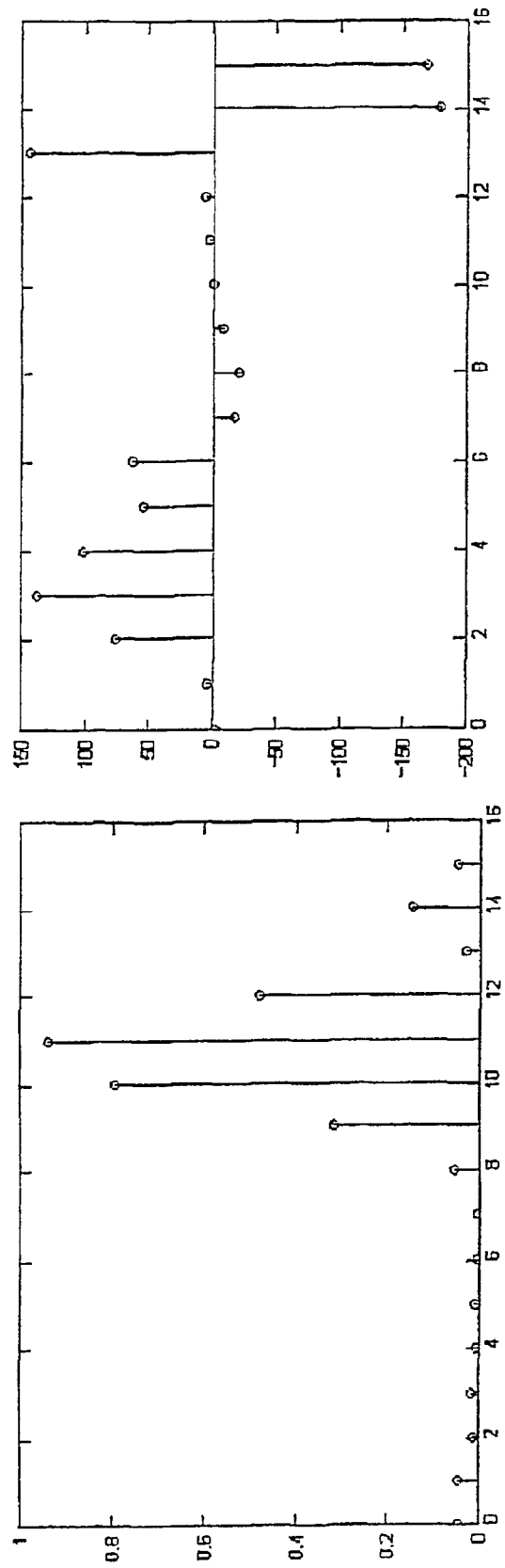

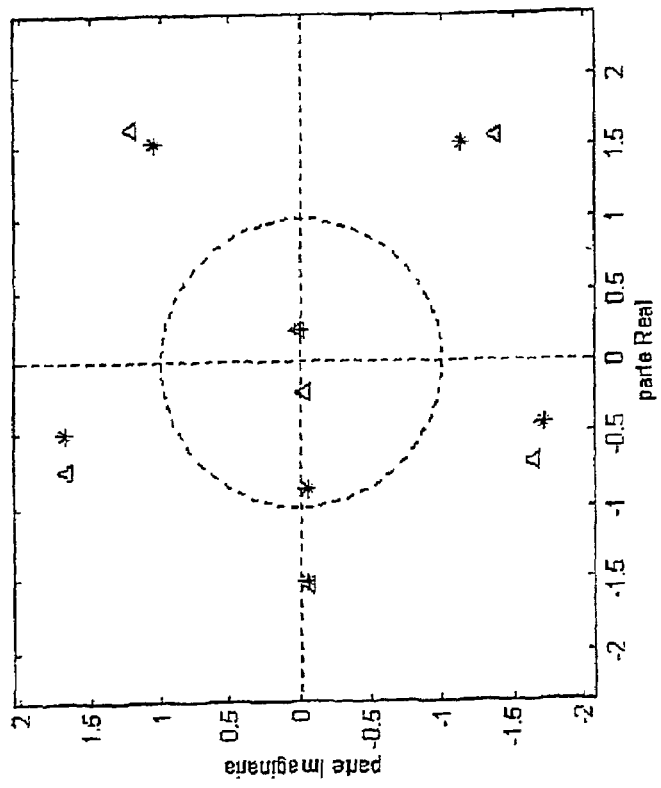
Fig. 3d: Zeros of $C^{EVEN}(z) - \triangle$ and $C^{ODD}(z) - *$.
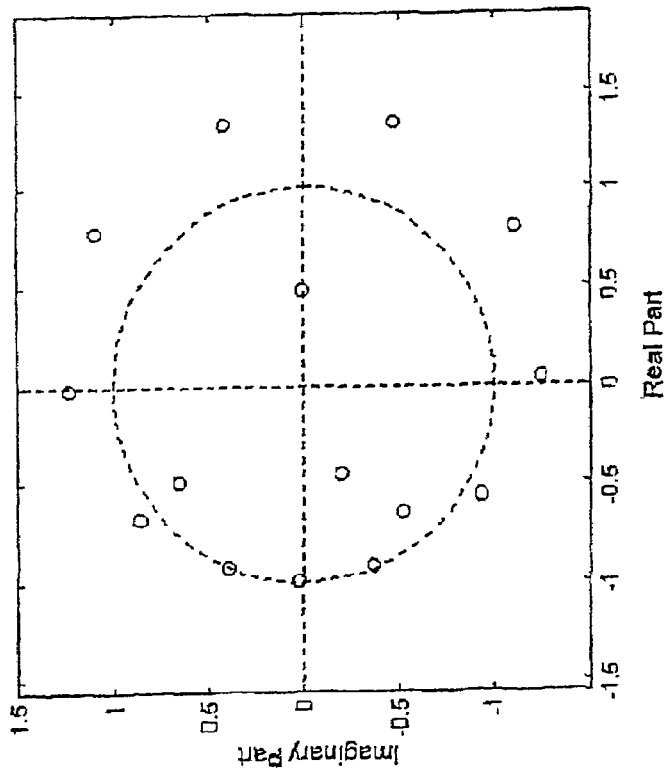
Fig. 3c: Zeros of $C(z)$.

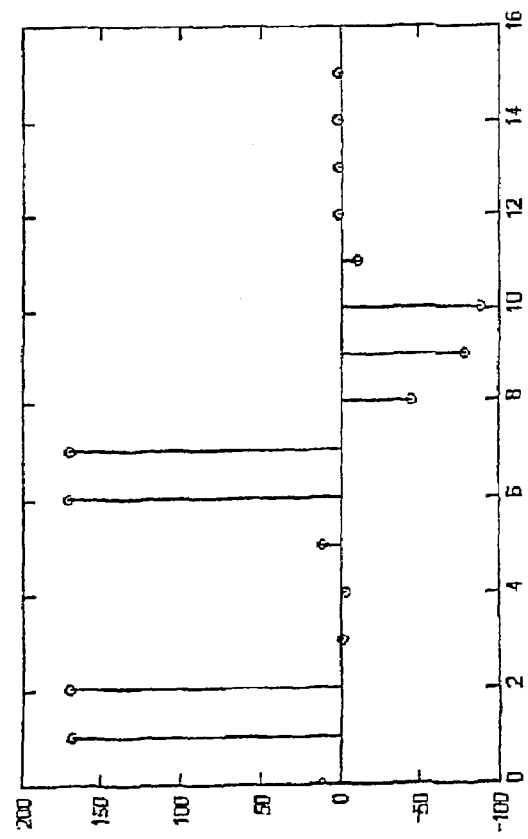
Fig. 4b: $\angle c(n)$ in degrees.
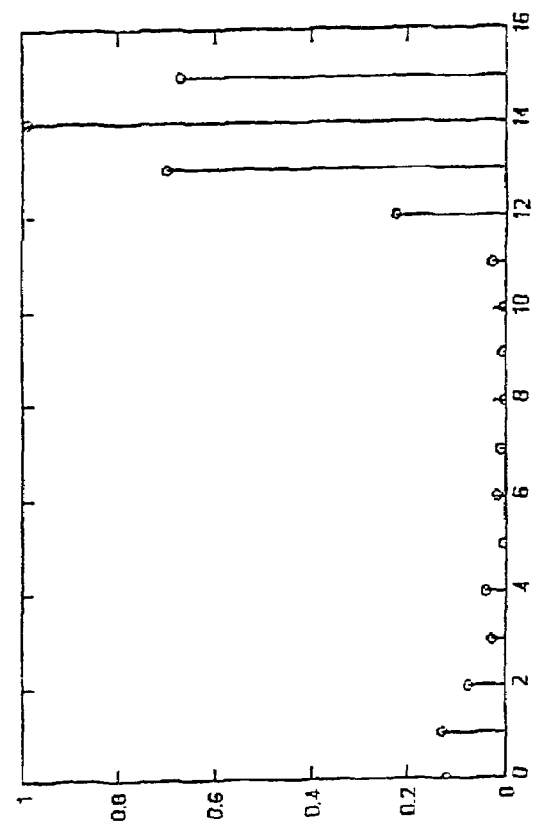
Fig. 4a: $|c(n)|$.

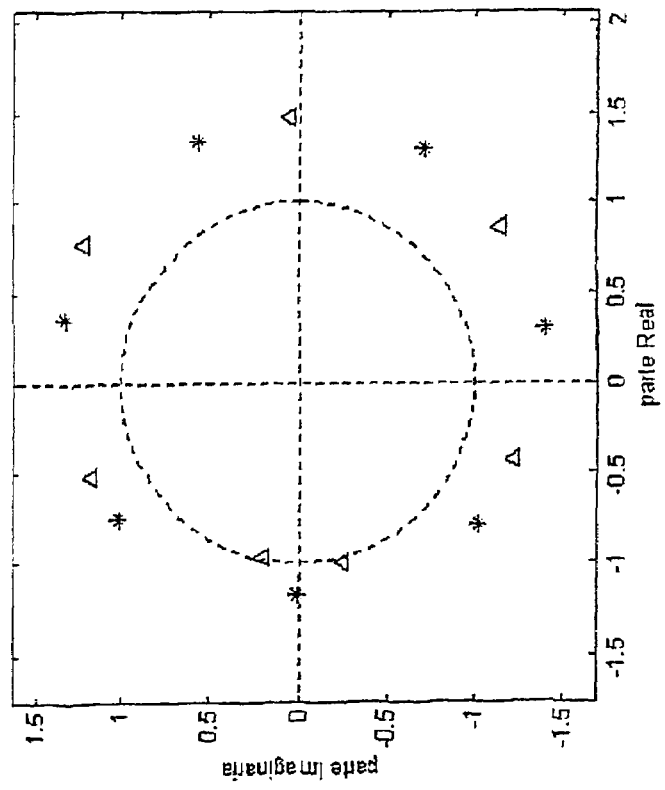
Fig. 4d: Zeros of $C^{EVEN}(z)$ — △ and $C^{ODD}(z)$ — *.
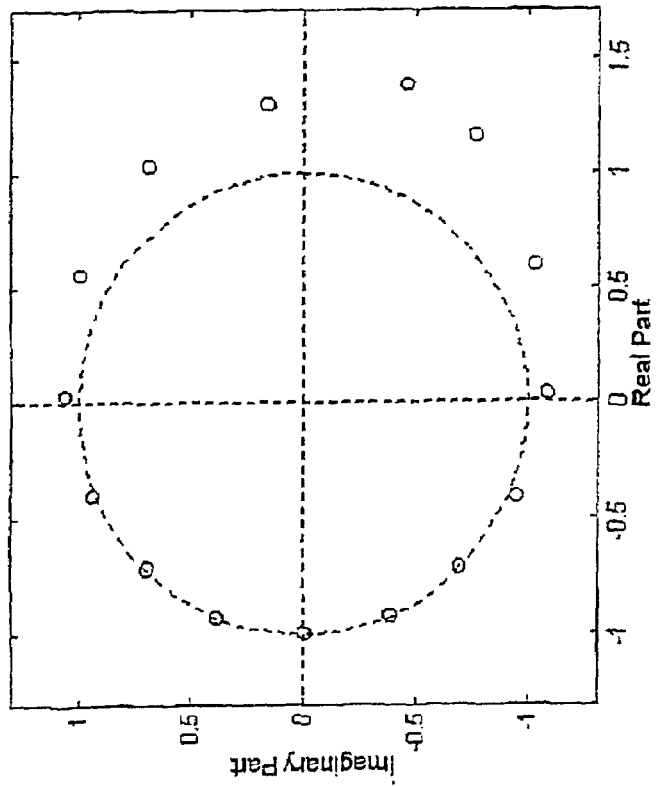
Fig. 4c: Zeros of $C(z)$.

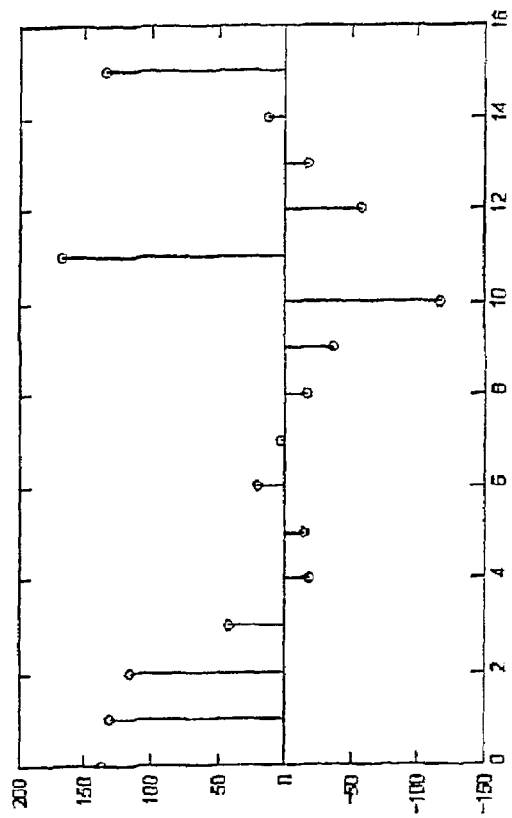
Fig. 5b: $\angle c(n)$ in degrees.
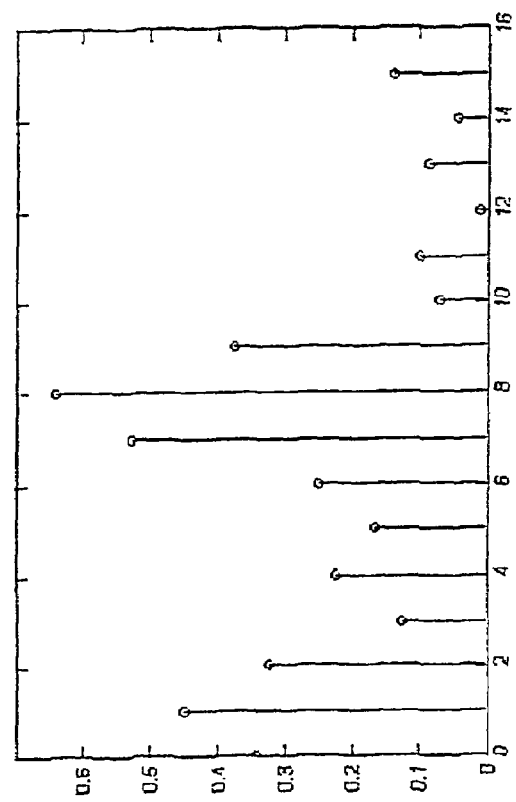
Fig. 5a: $|c(n)|$.

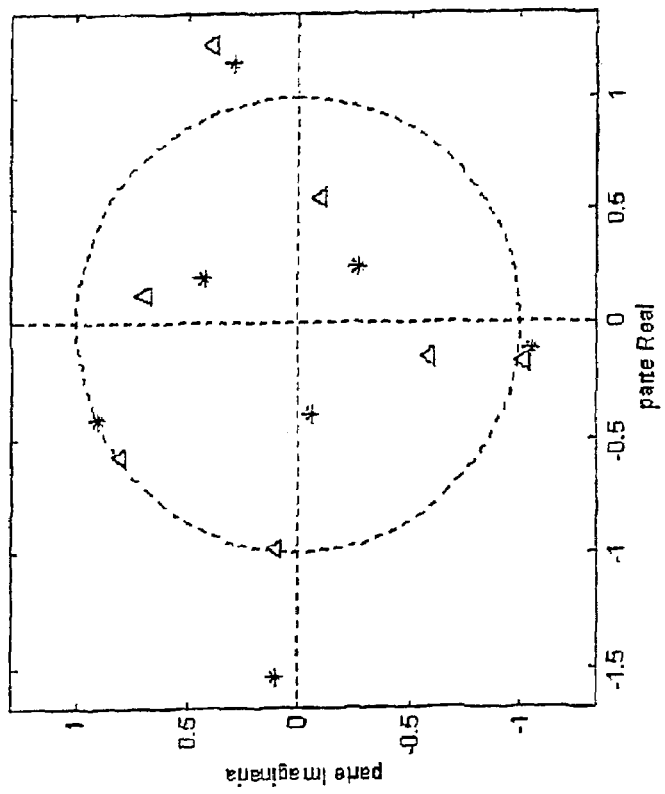
Fig. 5d: Zeros of $C^{EVEN}(z)$ — $\triangle$ and $C^{ODD}(z)$ — $*$.
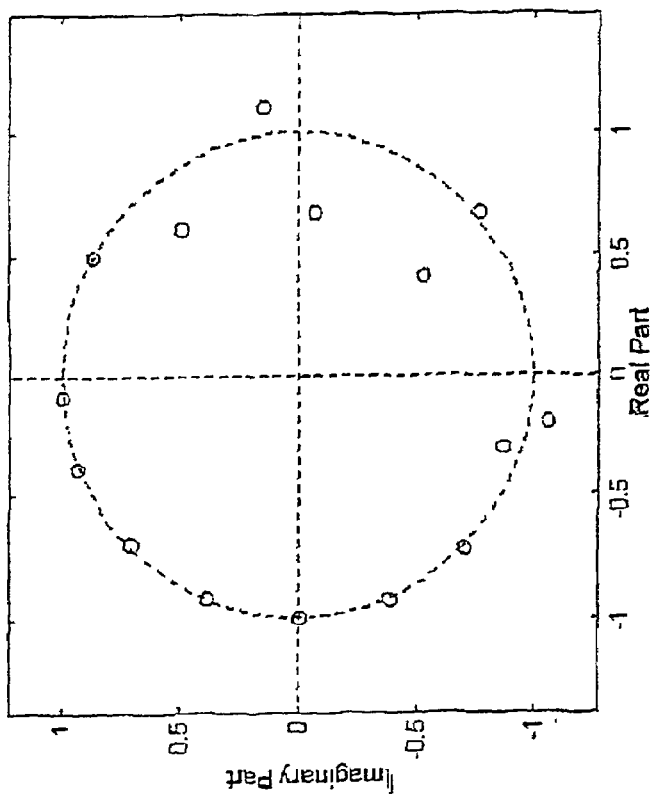
Fig. 5c: Zeros of $C(z)$.

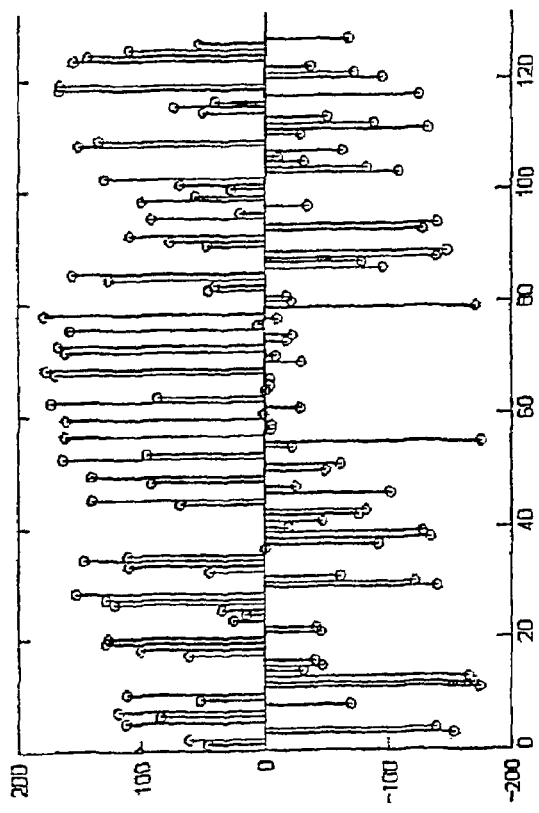
Fig. 6b: $\angle c(n)$ in degrees.
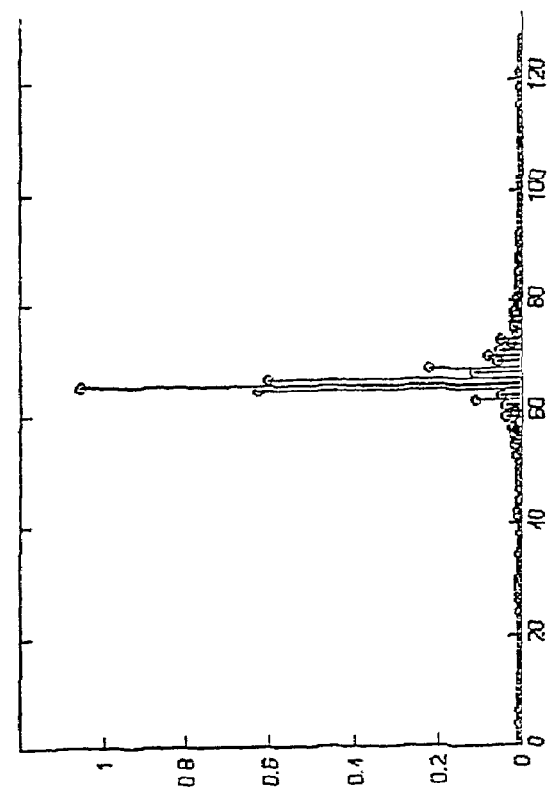
Fig. 6a: $|c(n)|$.

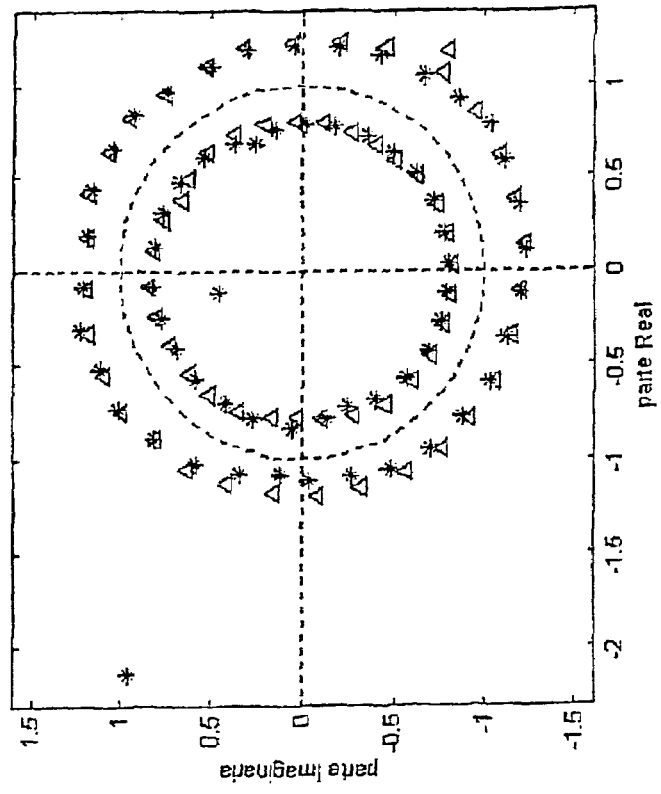
Fig. 6d: Zeros of $C^{EVEN}(z)$ — $\triangle$ and $C^{ODD}(z)$ — *.
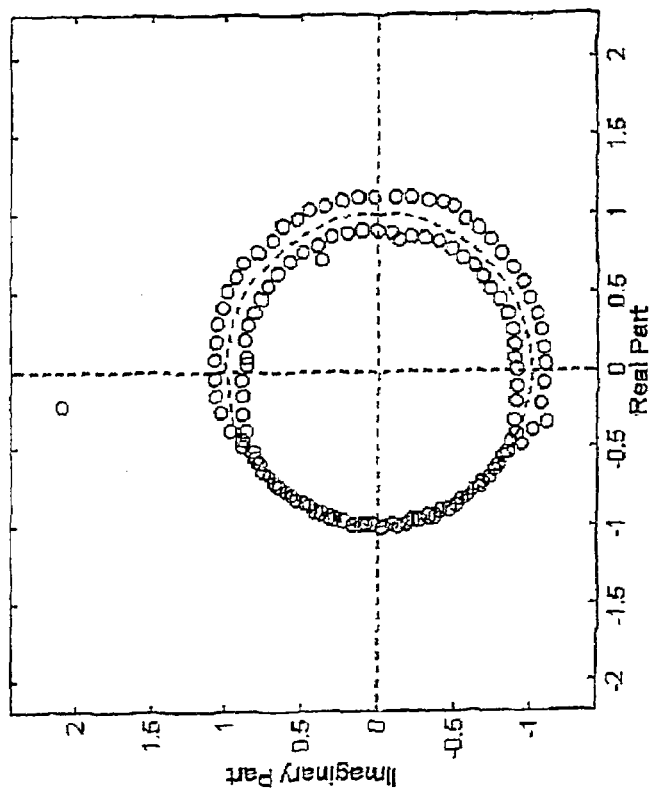
Fig. 6c: Zeros of $C(z)$.

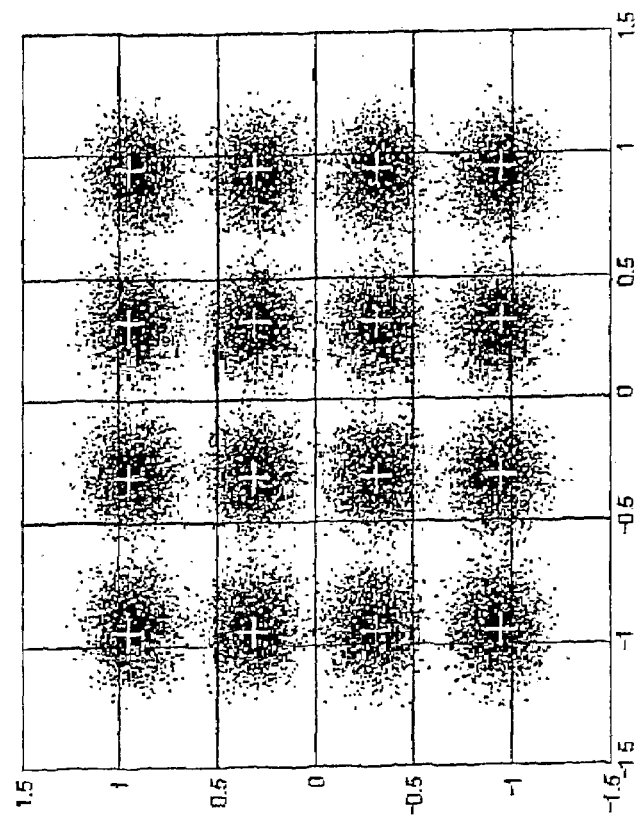
Fig. 7b: Ψ (CONC)
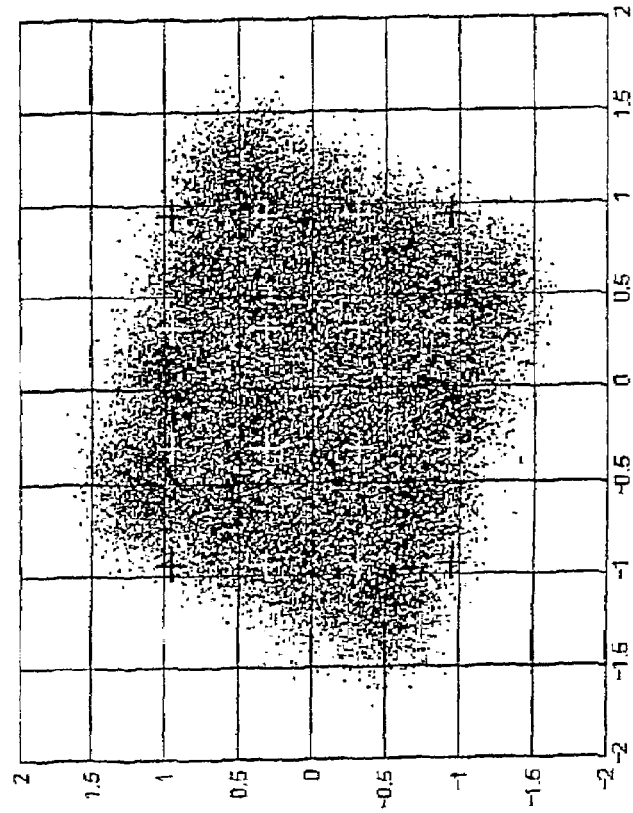
Fig. 7a: Γ (CMA)

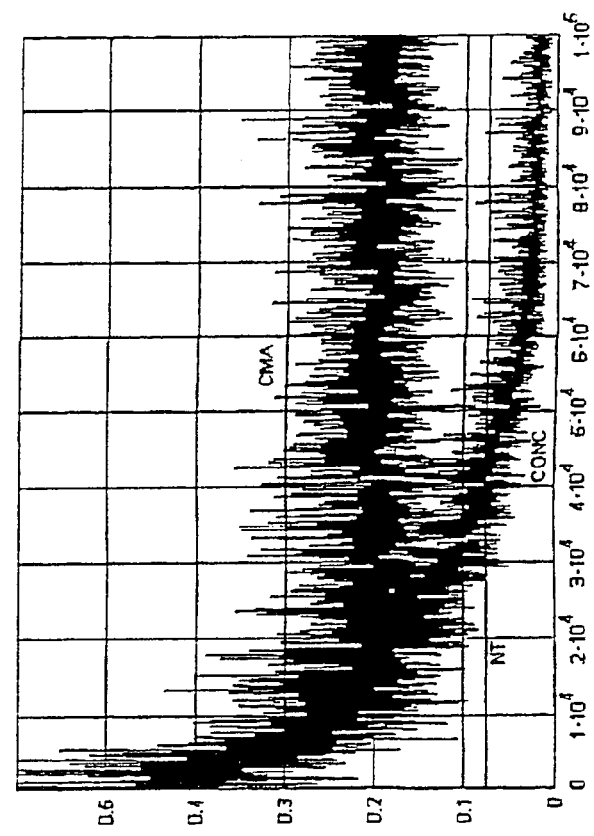
Fig. 7d: MSE(i)
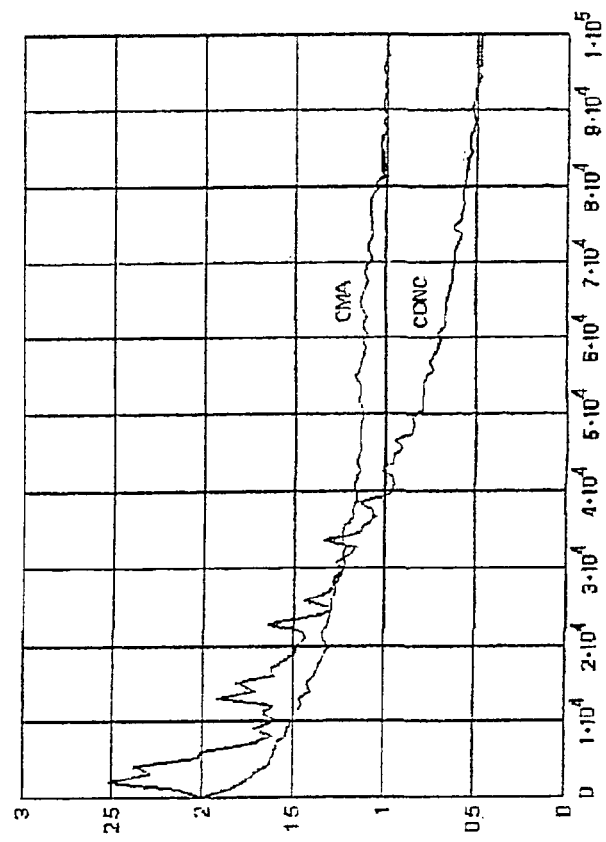
Fig. 7c: ISI(i)

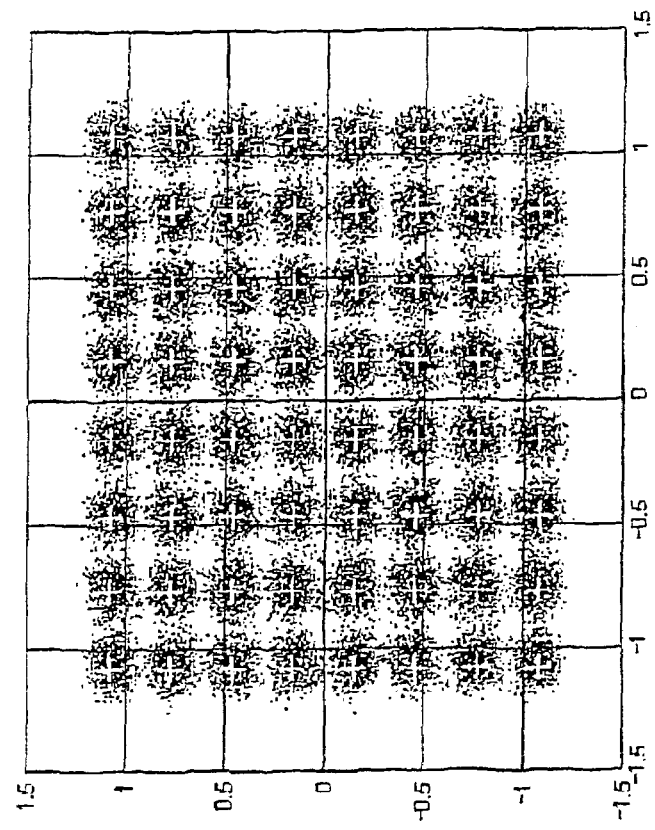
Fig. 8b: Ψ (CONC)
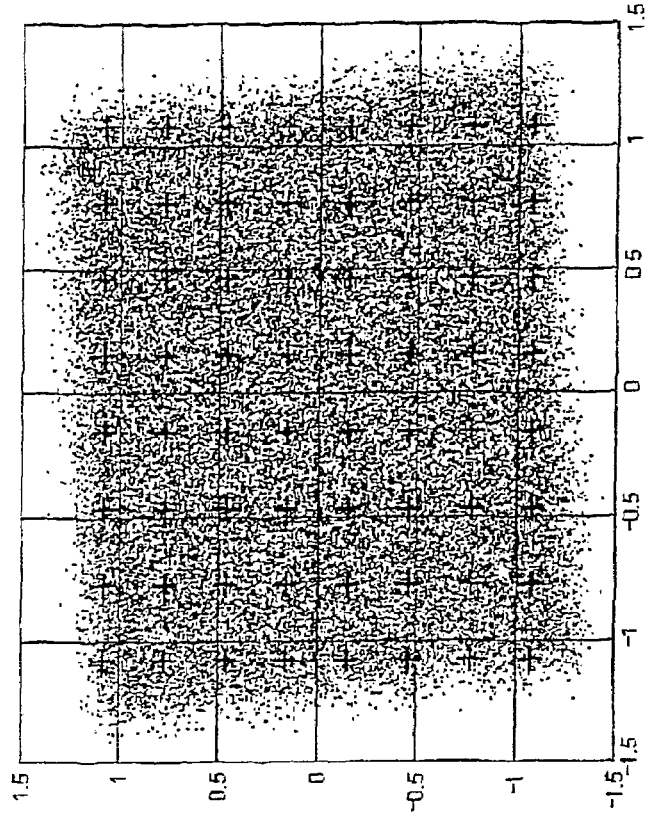
Fig. 8a: Γ (CMA)

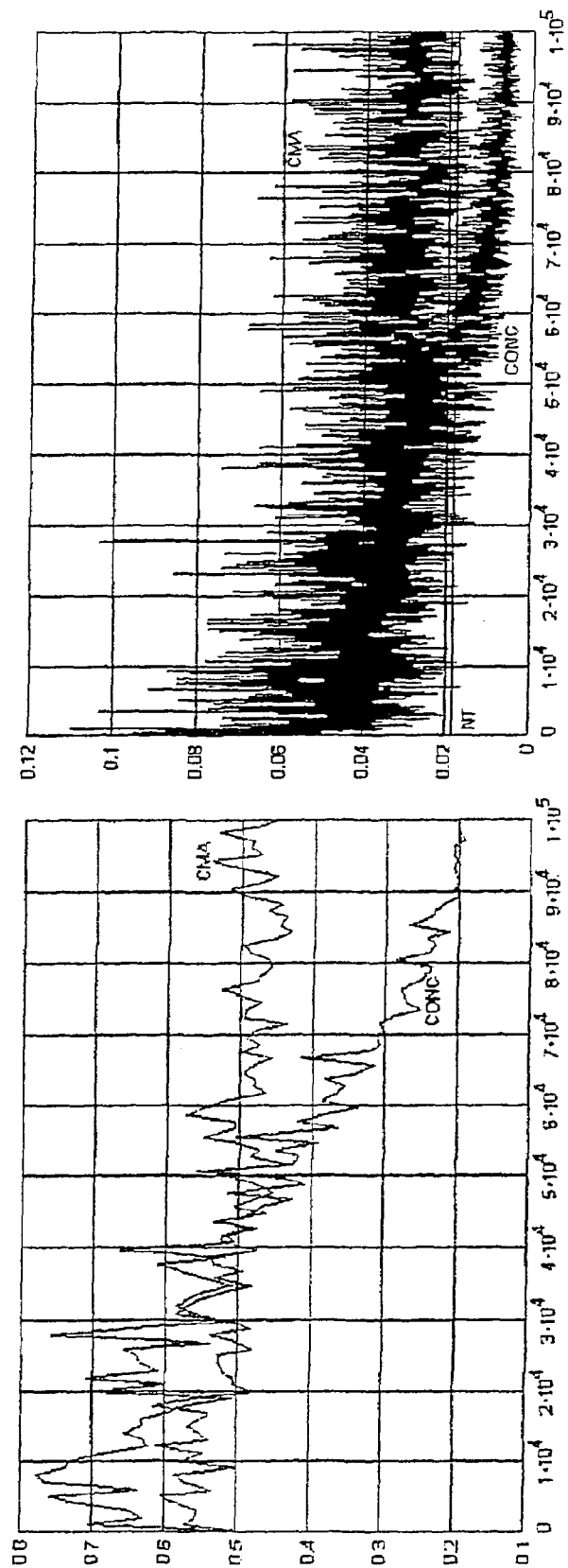
Fig. 8c: ISI(i)
Fig. 8d: MSE(i)

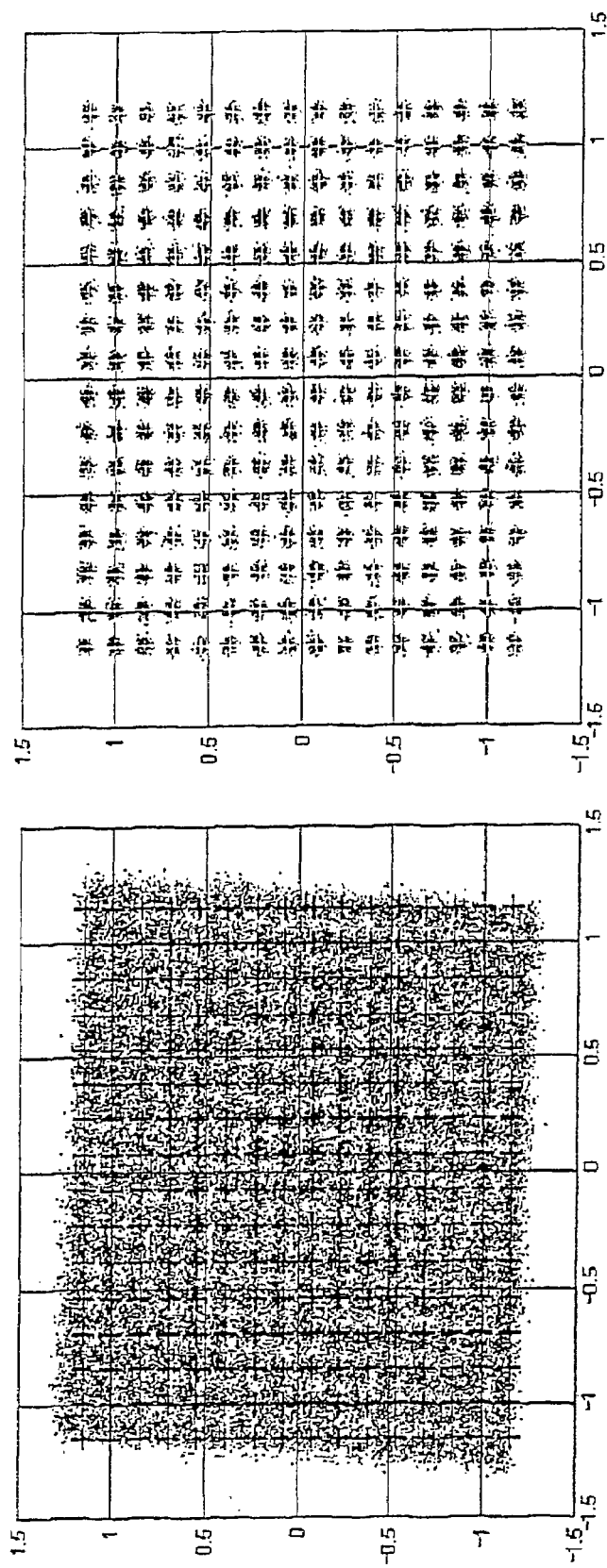

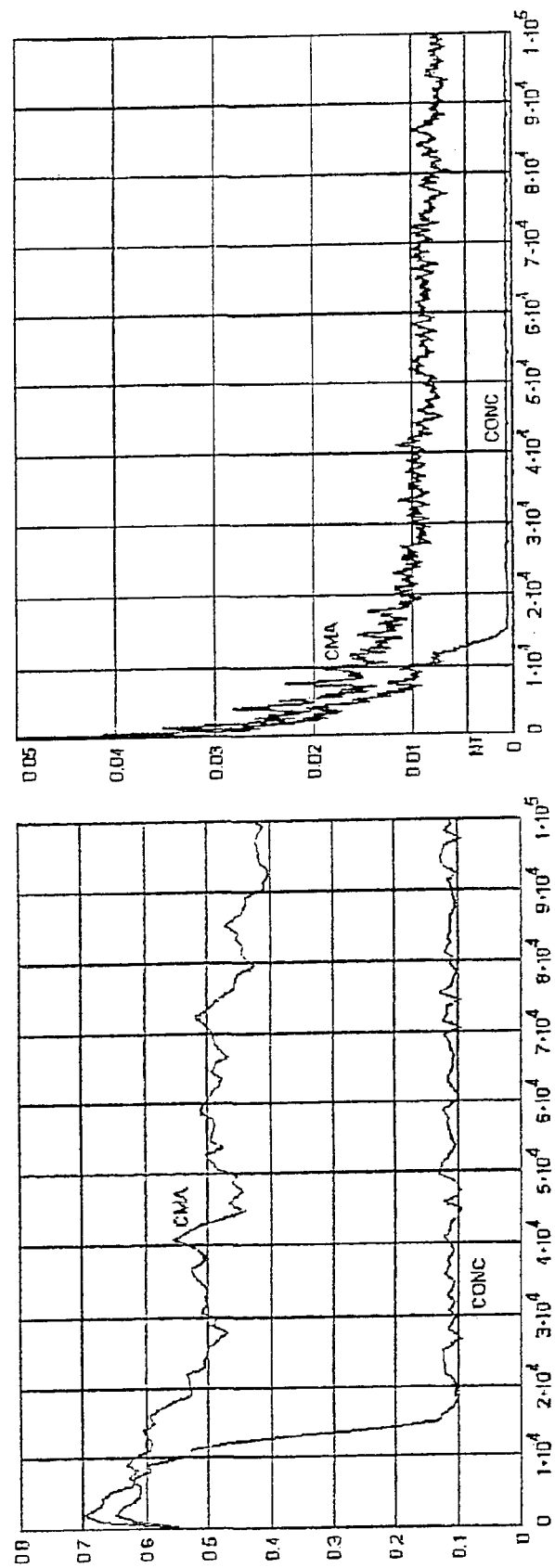
Fig. 9c: ISI(i)
Fig. 9d: MSE(i)

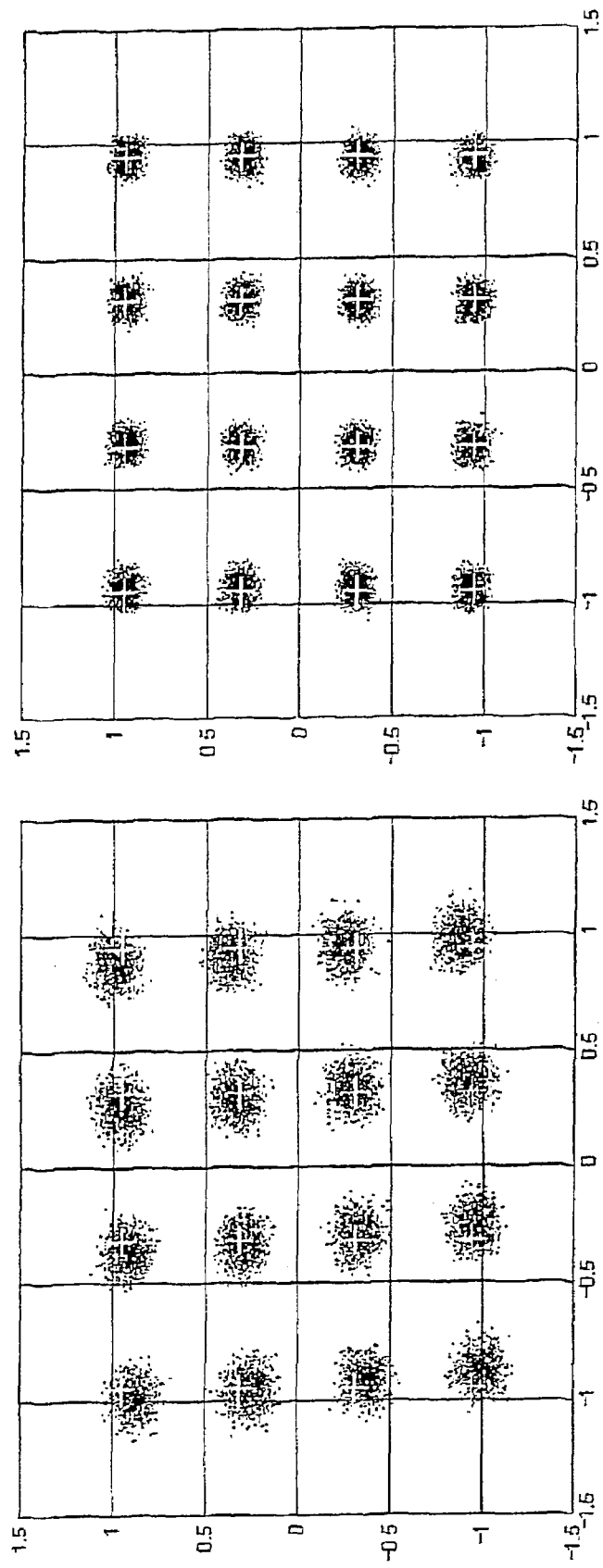

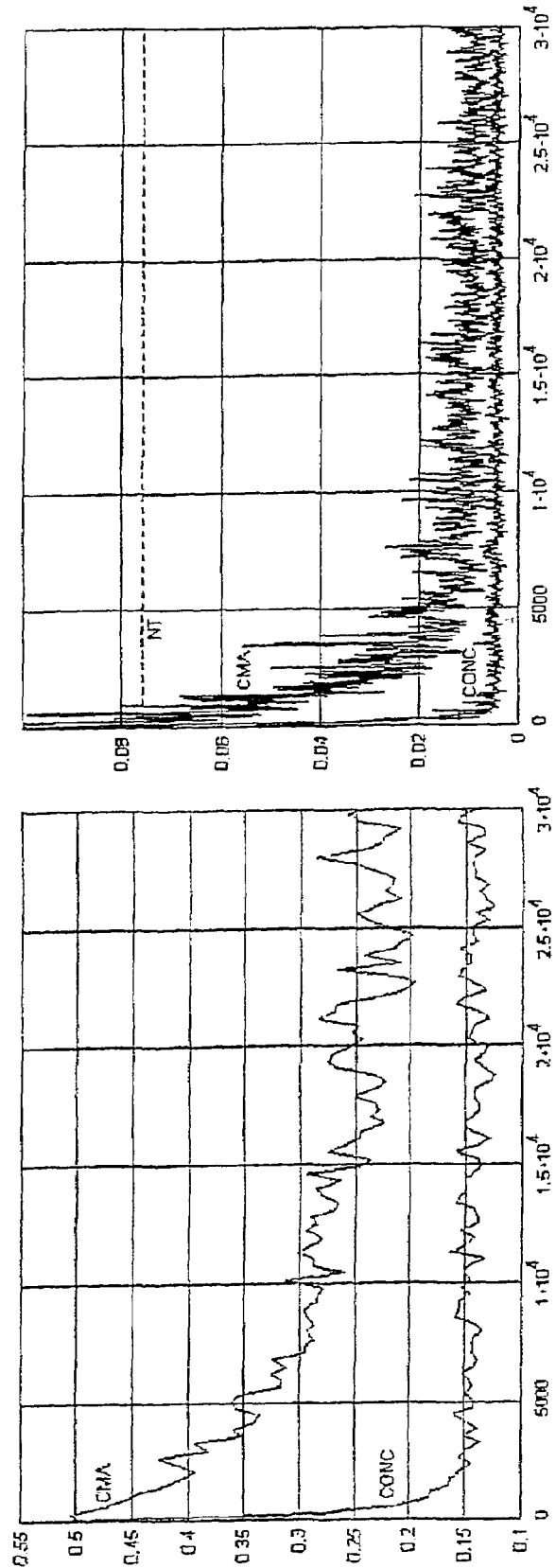
Fig. 10d: MSE(i)
Fig. 10c: ISI(i)

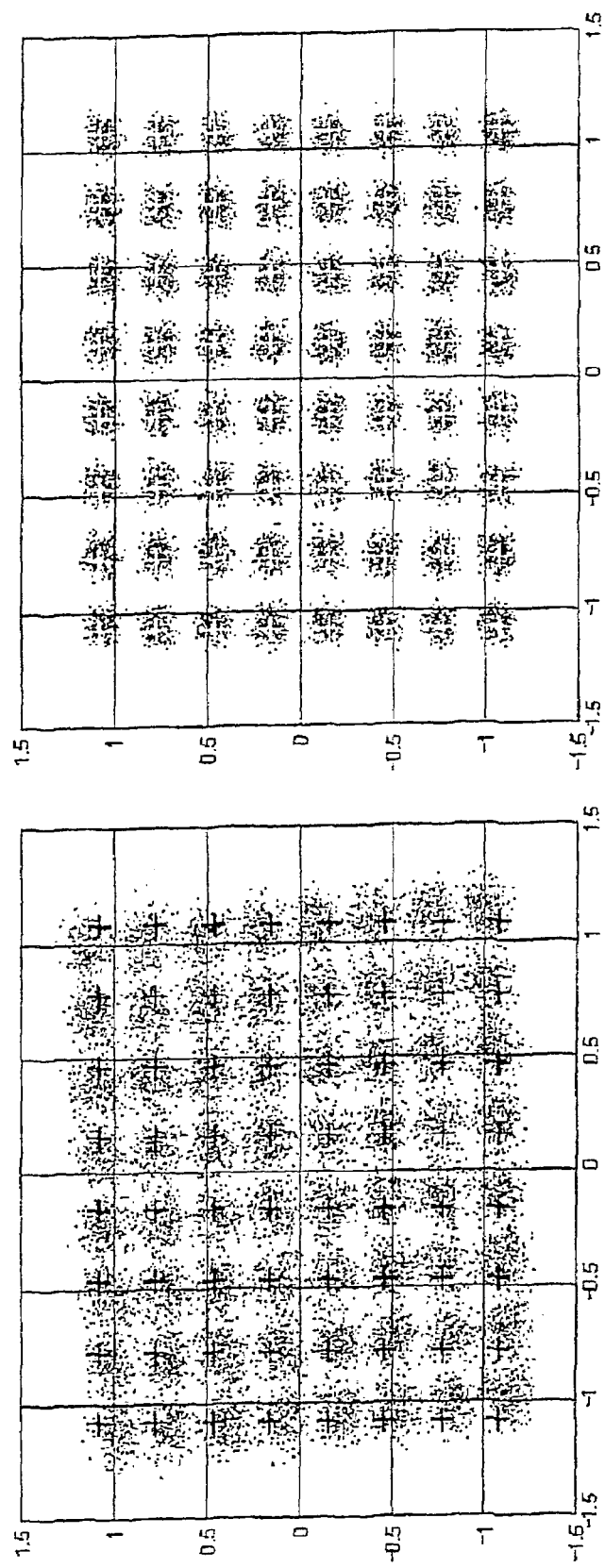

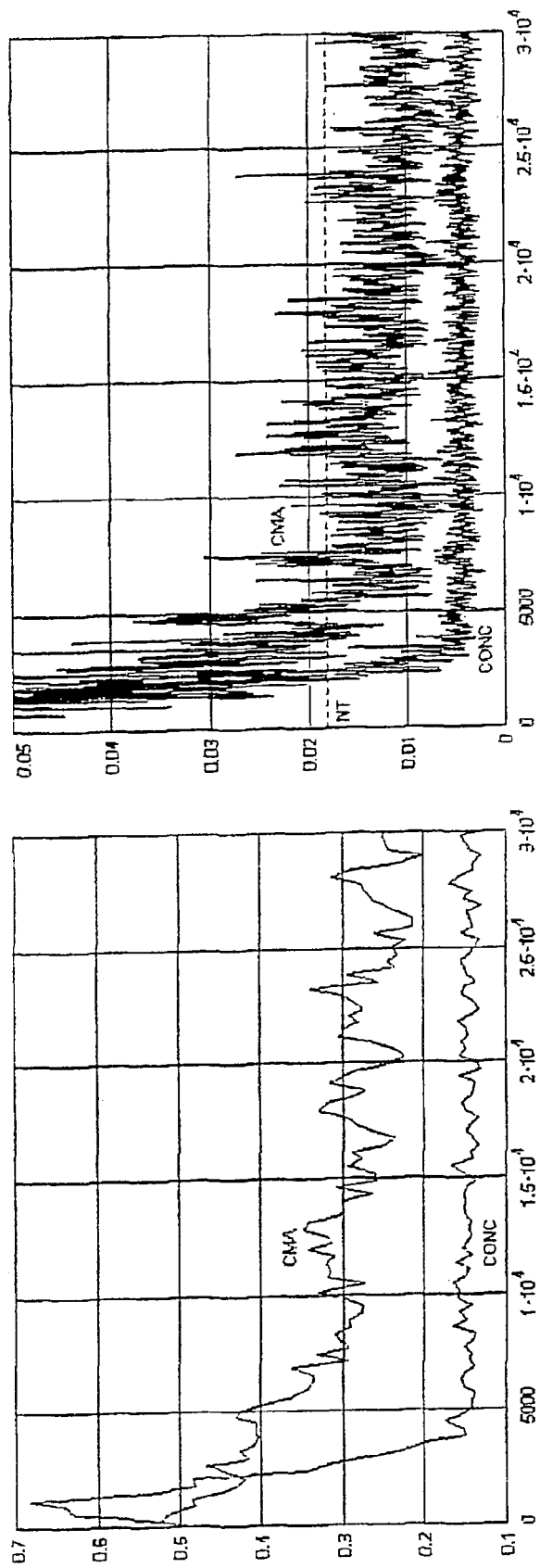
Fig. 11c: ISI(i)
Fig. 11d: MSE(i)

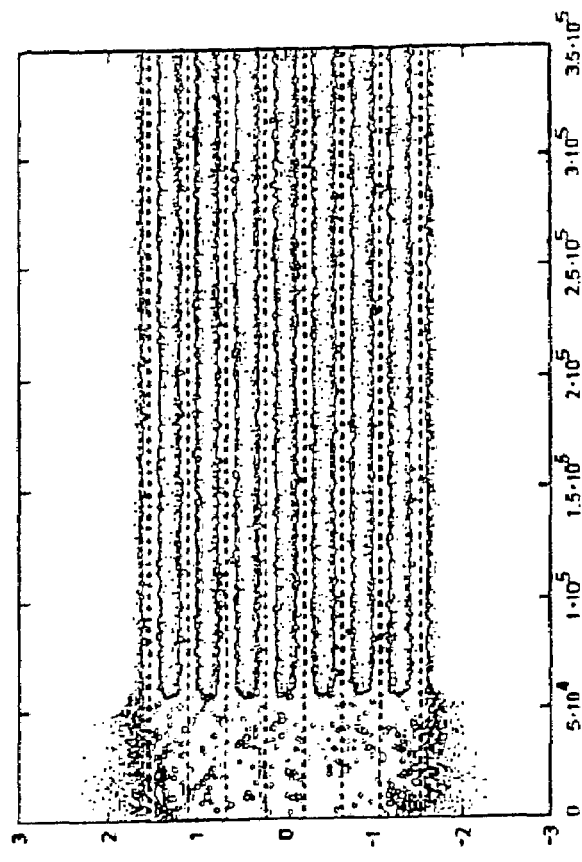
Fig. 14b: $y_{CONC}(n)$
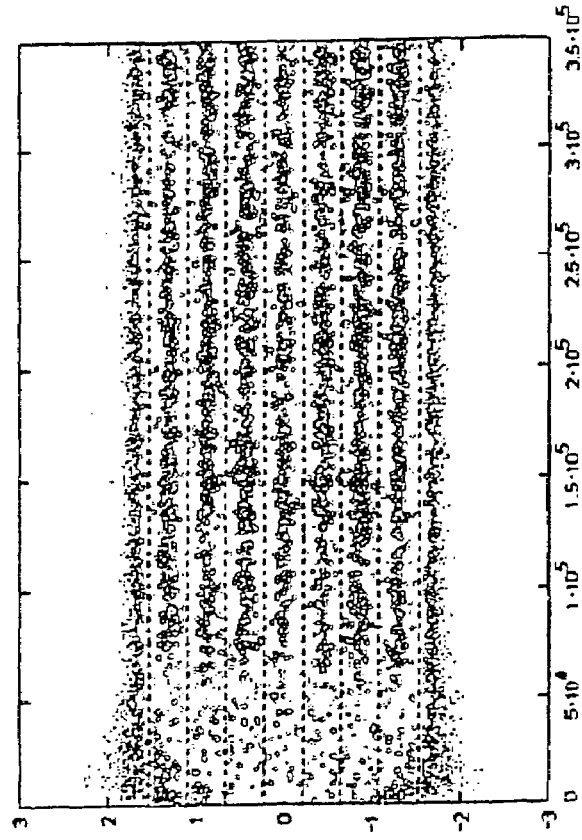
Fig. 14a: $y_{CMA}(n)$

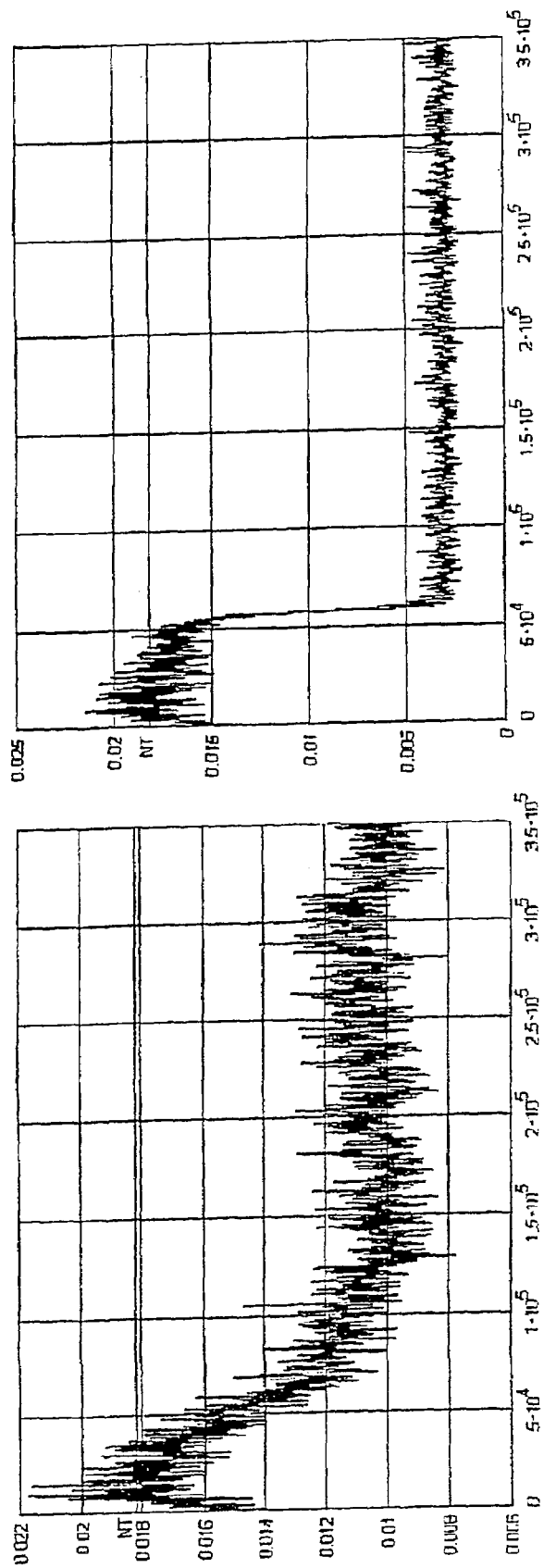
Fig. 14c: $MSE_{CMA}(n)$
Fig. 14d: $MSE_{CONC}(n)$

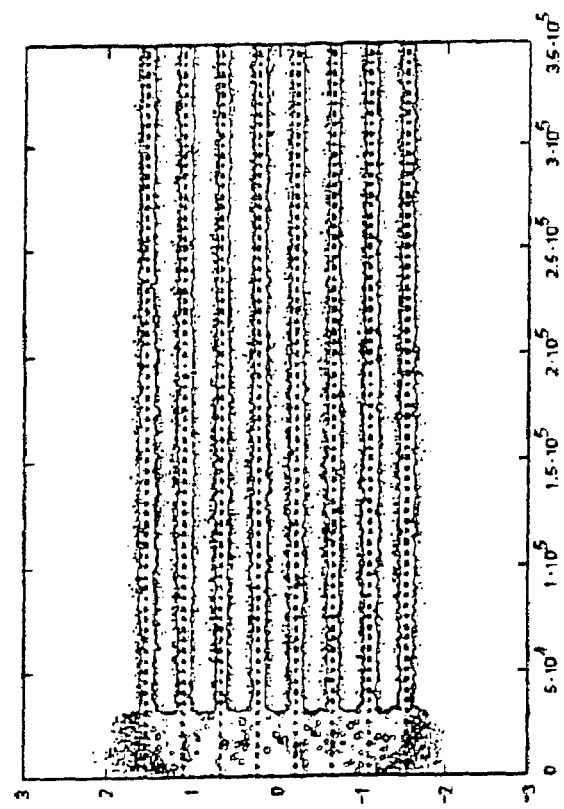
Fig. 15b: $y_{CONC}(n)$
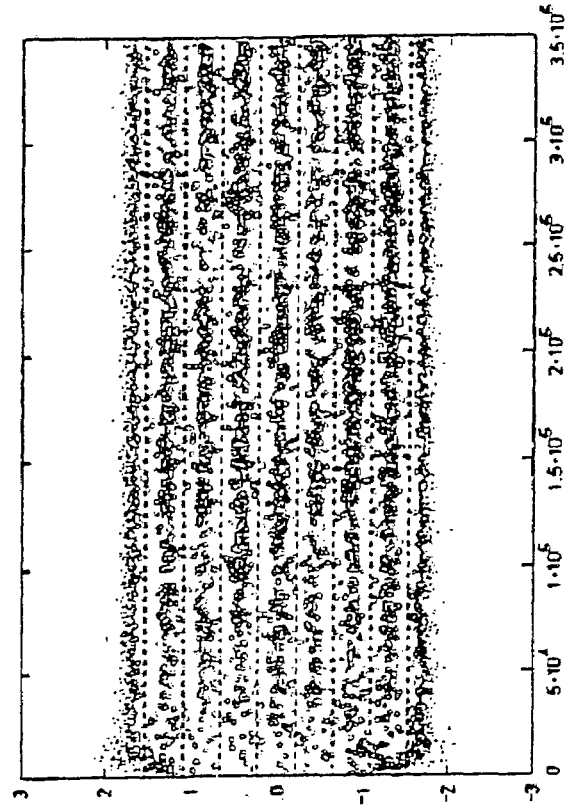
Fig. 15a: $y_{CMA}(n)$

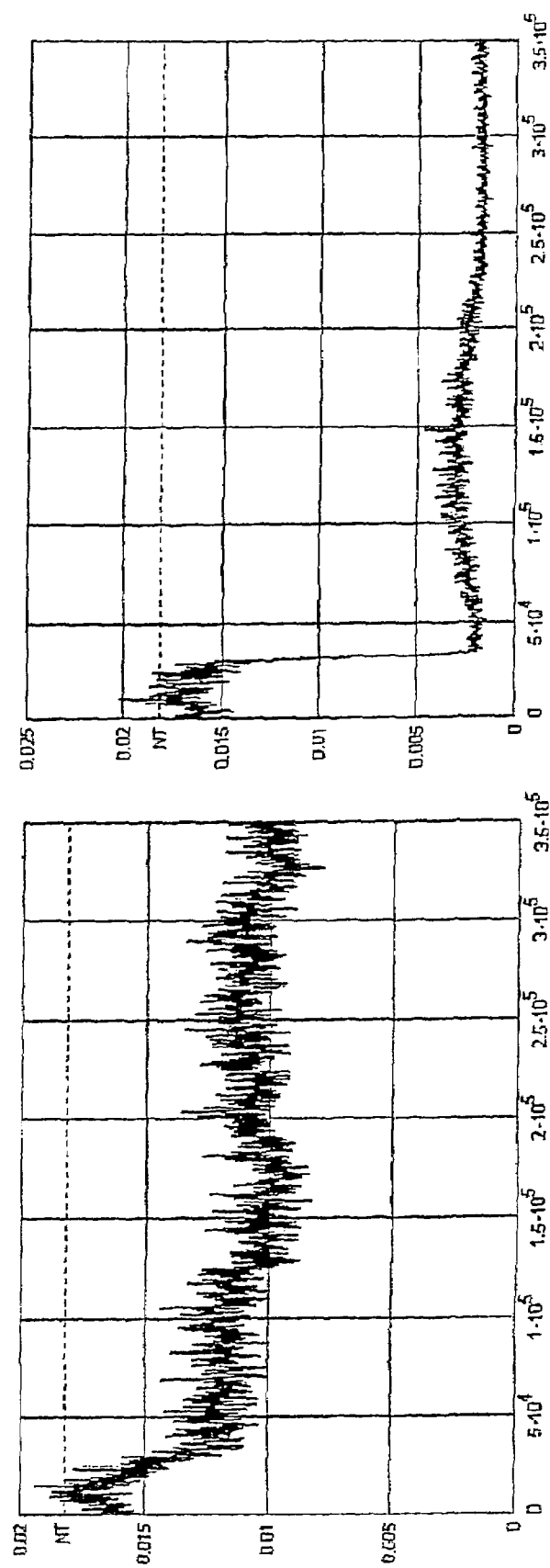
Fig. 15c: $MSE_{CMA}(n)$
Fig. 15d: $MSE_{CONC}(n)$

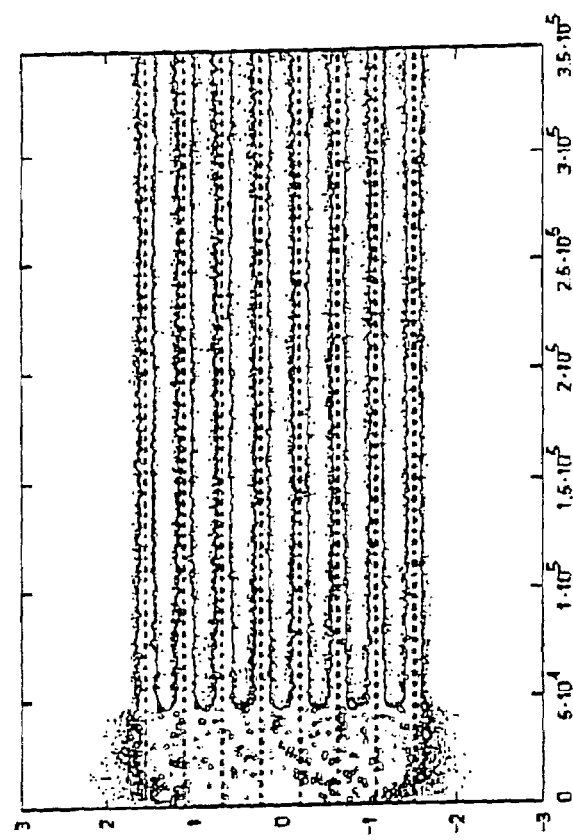
Fig. 16b: $y_{CONC}(n)$
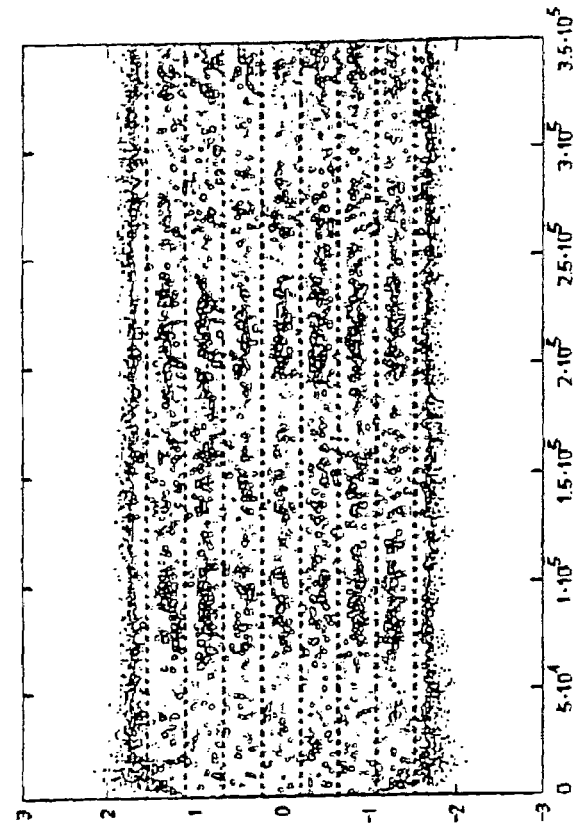
Fig. 16a: $y_{CMA}(n)$

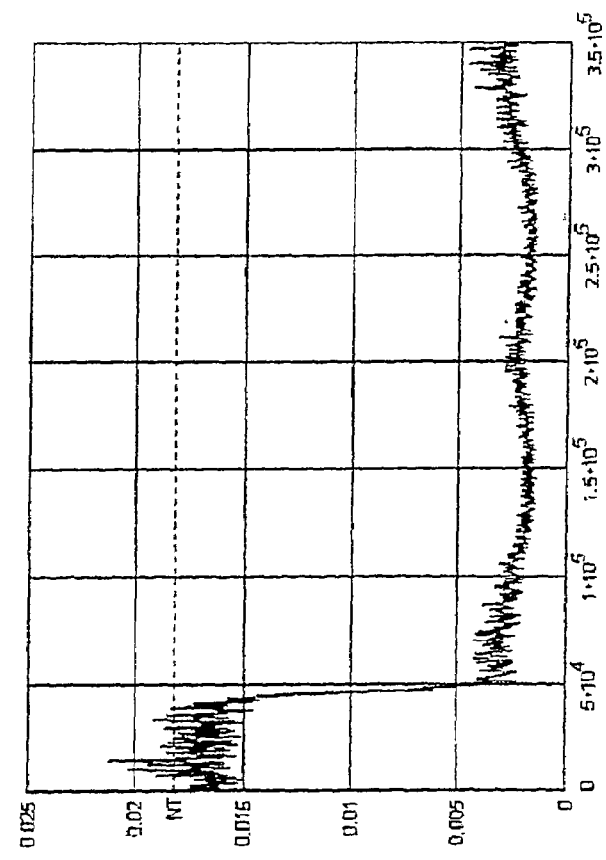
Fig. 16d: $MSE_{CONC}(n)$
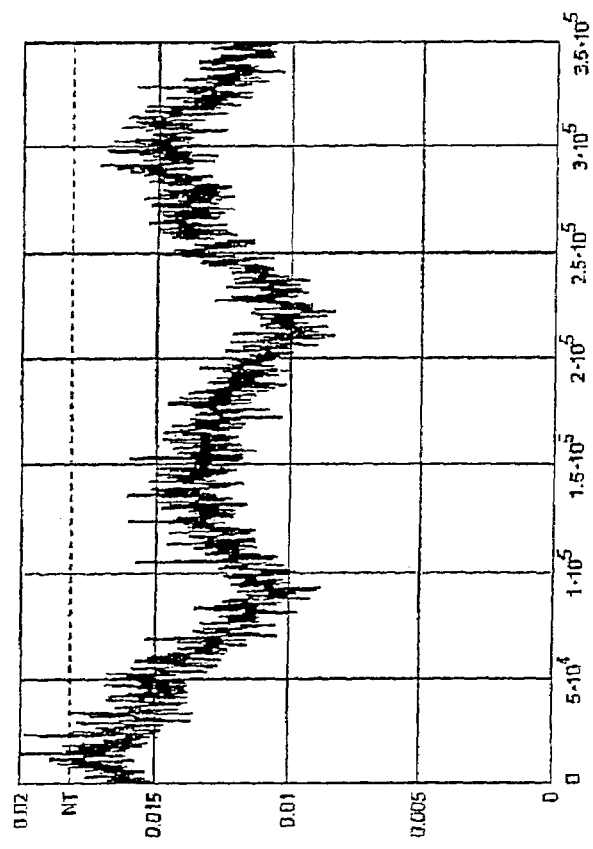
Fig. 16c: $MSE_{CMA}(n)$

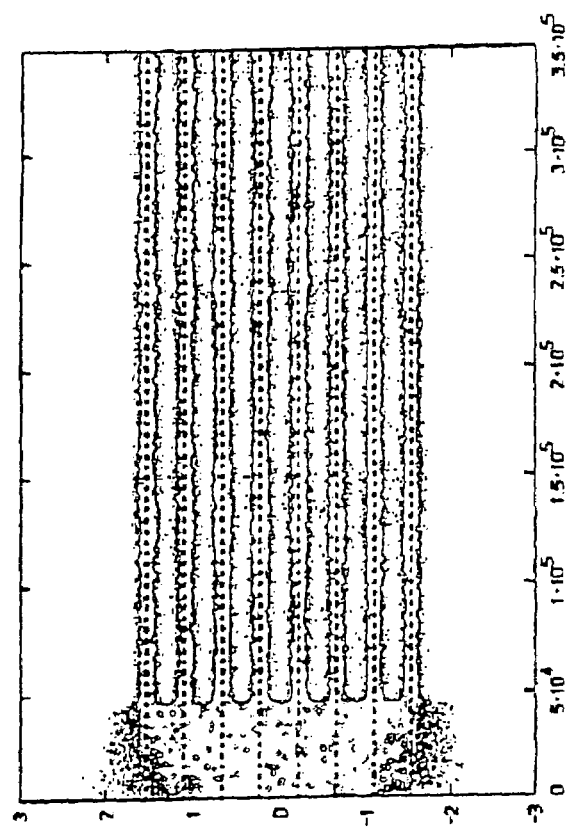
Fig. 17b: $y_{conc}(n)$
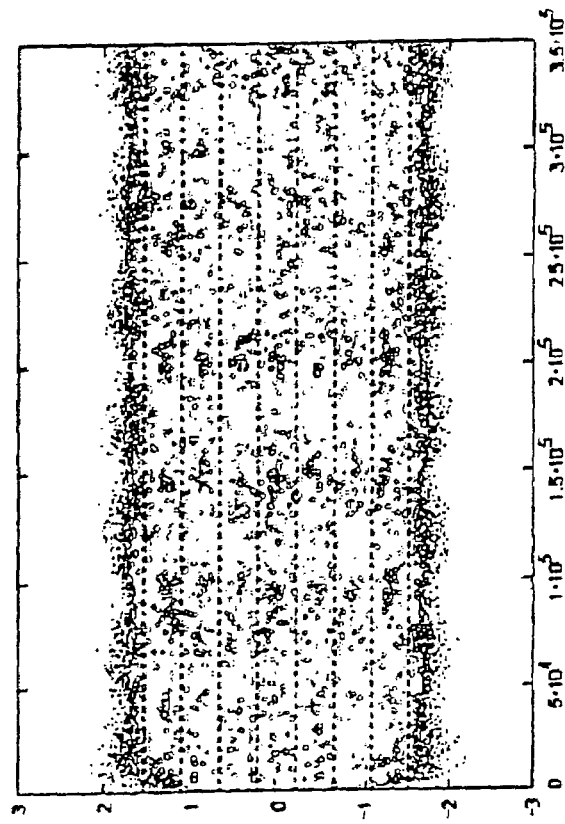
Fig. 17a: $y_{CHA}(n)$

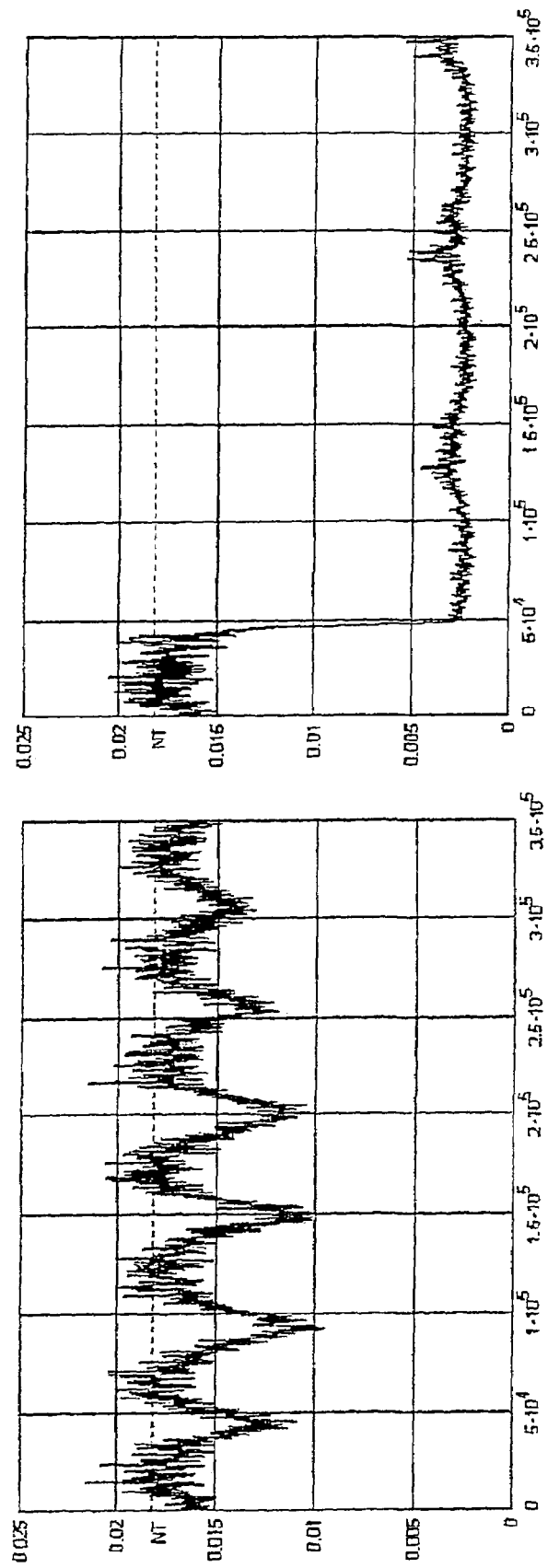
Fig. 17c: $MSE_{CMA}(n)$
Fig. 17d: $MSE_{CCMC}(n)$

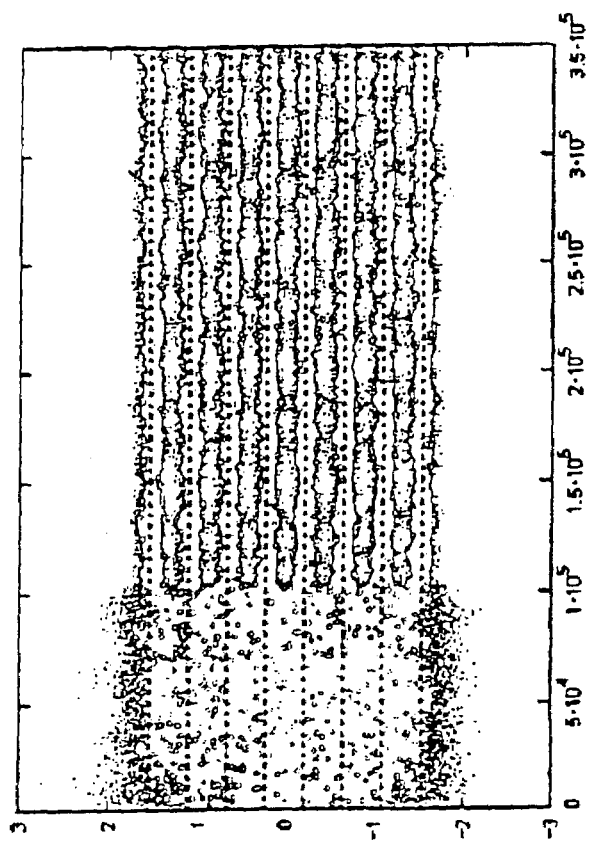
Fig. 18b: $y_{conc}(n)$
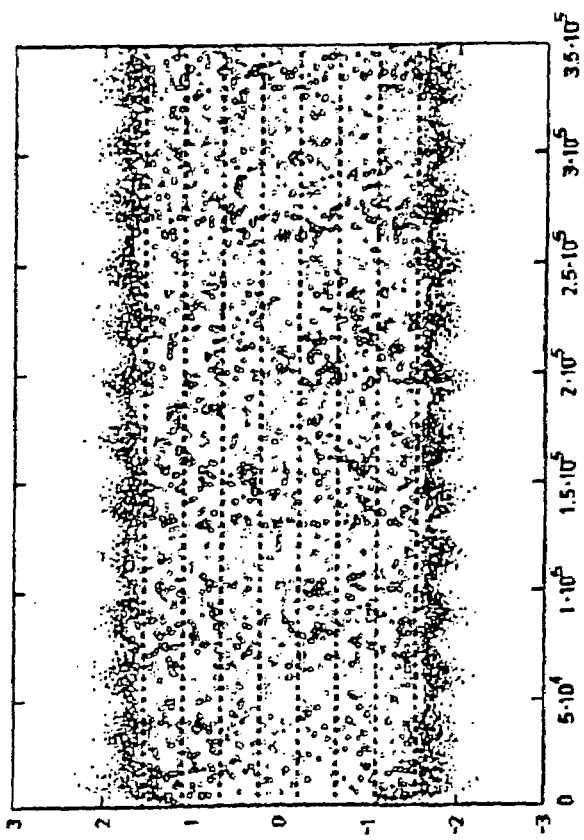
Fig. 18a: $y_{CMA}(n)$

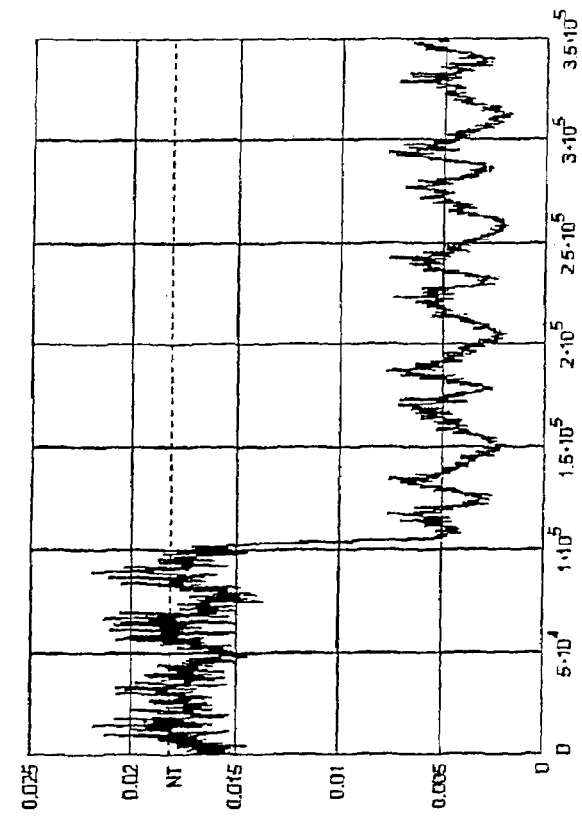
Fig. 18d: $MSE_{CONC}(n)$
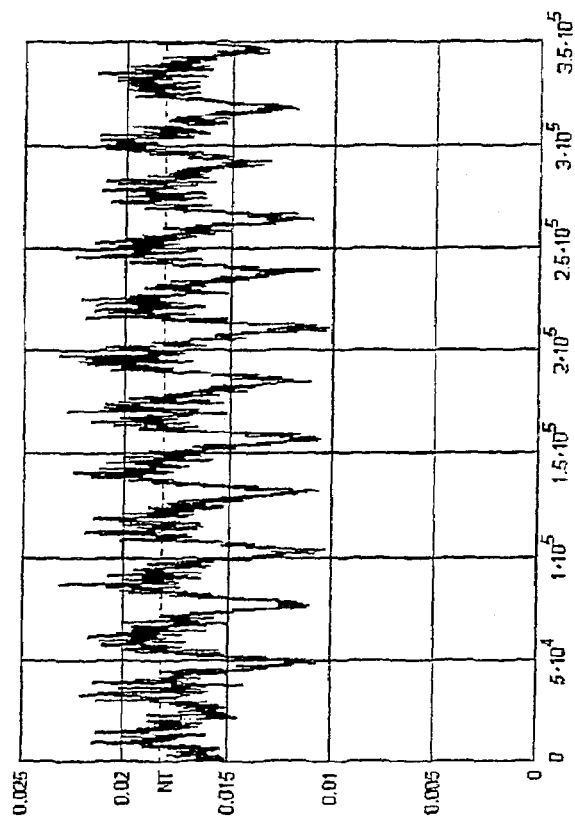
Fig. 18c: $MSE_{CMA}(n)$

CONCURRENT PROCESS FOR BLIND DECONVOLUTION OF DIGITAL SIGNALS

CROSS-REFERENCE TO RELATED APPLICATIONS

This patent application is a continuation of and claims priority on U.S. patent application Ser. No. 10/469,628 having a filing date of 29 Aug. 2003, now abandoned which claims priority on and is the Patent Cooperation Treaty (PCT) Chapter II United States National Phase of PCT International Application No. PCT/BR02/00030 having an International Application Date of 2 Mar. 2002, which in turn is based on and claims priority on Brazilian Patent Application No. PI0101198-8 having a filing date of 2 Mar. 2001, all of which are incorporated herein by this reference.

BACKGROUND OF THE INVENTION

This invention is related to the field of concurrent processes for blind deconvolution of digital signals for reducing and eliminating intersymbol interference in digital signals, which is a result of the dispersive effect of any practical transmission channel.

BRIEF SUMMARY OF THE INVENTION

The concurrent process for blind deconvolution of digital signals described herein is intended to reduce and, possibly, eliminate the problem of intersymbol interference in digital signals, which is a result of the dispersive effect of any practical transmission channel. The process has the following working principle: the deconvolution is done by two filters, denominated herein V and W, whose two signals that result respectively from the filtering action of each filter jointly define the output signal y of the deconvolution process. The coefficients of filter V are adjusted by gradient methods, or equivalent, based on a cost function that measures a statistic dispersion of y. The coefficients of filter W are adjusted by gradient methods, or equivalent, based on a cost function that measures a distance from y to the nearest digital alphabet symbol. The updating of the coefficients of filters W and V is such that the updating of the coefficients of W depends on the updating of the coefficients of V by means of a non-linear function. The results obtained demonstrate that the process described herein presents a performance comparatively superior to the processes usually adopted for the solution of this type of problem, and the range of possible applications and/or devices to be protected. Applications and/or devices subject to having their performance improved by the use of the concurrent process for blind deconvolution of digital signals include but are not limited to: spatial-temporal processing (used, for example, in smart antennas or smart sensors, etc.); any digital telecommunication systems (cellular telephony, digital television, digital radio, etc.); telemetry systems; remote sensing systems; geodesic localization/measurement systems (GPS, etc.); navigation aid systems; seismic survey systems by wave refraction/reflection, magnetic media storage systems, RADAR systems, and SONAR systems.

The concurrent process for blind deconvolution of digital signals, implemented by means of the concurrent equalizer, presents the capability to efficiently reach, under the same operational situation, a condition much closer to the zero-forcing condition, or equivalent, than the other equalizers used in the current scenario. This scenario includes the universally used- and renowned-CMA equalizer. This allows the concurrent equalizer to be used to deconvolve channels with denser symbol constellation than the current technologic state permits. This way, the use of the concurrent equalizer for blind deconvolution of digital signals will allow for an increase in the transmission rate for those digital systems that have their maximum speed limited by the operation of the equalizer (for example, see Z. Ding, R. A. Kennedy, B. D. O. Anderson e C. R. Johnson Jr., "III-Convergence of Godard Blind Equalizers in Data Communication Systems", IEEE Transactions on Communications, vol. 39, no. 9, pp. 1313-1327, September 1991).

BRIEF DESCRIPTION OF THE DRAWINGS

FIG. 3 shows the characterization of channel M4, with FIG. 3a |c(n)|, FIG. 3b ∠c(n) in degrees, FIG. 3c zeros of C(z), and FIG. 3d zeros of $c^{EVEN}(z)-\Delta$ and $c^{ODD}(z)-*$.

FIG. 4 shows the characterization of channel M9, with FIG. 4a |c(n)|, FIG. 4b ∠c(n) in degrees, FIG. 4c zeros of C(z), and FIG. 4d zeros of $c^{EVEN}(z)-\Delta$ and $c^{ODD}(z)-*$.

FIG. 5 shows the characterization of channel M14, with FIG. 5a |c(n)|, FIG. 5b ∠c(n) in degrees, FIG. 5c zeros of C(z), and FIG. 5d zeros of $c^{EVEN}(z)-\Delta$ and $c^{ODD}(z)-*$.

FIG. 6 shows the characterization of channel C1, with FIG. 6a |c(n)|, FIG. 6b ∠c(n) in degrees, FIG. 6c zeros of C(z), and FIG. 6d zeros of $c^{EVEN}(z)-\Delta$ and $c^{ODD}(z)-*$.

FIG. 7 shows comparative results between the CMA equalizer and the concurrent equalizer (CONC) for channel M14, modulation 16-QAM ($\gamma$=1.32), SNR=35 dB, with the parameters: $N_a$=100000, $\eta$=1×10$^{-3}$, $\eta_v$=1×10$^{-3}$, $\eta_w$=1×10$^{-2}$, L=$L_c$=16 and $\xi$=6, with FIG. 7a Γ(CMA), FIG. 7b Ψ(CONC), FIG. 7c ISI(i), and FIG. 7d MSE(i).

FIG. 8 shows comparative results between the CMA equalizer and the concurrent equalizer (CONC) for channel M9, modulation 64-QAM ($\gamma$=1.380953), SNR=35 dB, with the parameters: $N_a$=100000, $\eta$=1×10$^{-3}$, $\eta_v$=1×10$^{-3}$, $\eta_w$=1×10$^{-2}$, L=$L_c$=16 and $\xi$=2, with FIG. 8a Γ(CMA), FIG. 8b Ψ(CONC), FIG. 8c ISI(i), and FIG. 8d MSE(i).

FIG. 9 shows comparative results between the CMA equalizer and the concurrent equalizer (CONC) for channel C1, modulation 256-QAM ($\gamma$=1.395295), SNR=35 dB, with the parameters: $N_a$=100000, $\eta$=1×10$^{-4}$, $\eta_v$=1×10$^{-4}$, $\eta_w$=1×10$^{-3}$, L=$L_c$=128 and $\xi$=63, with FIG. 9a Γ(CMA), FIG. 9b Ψ(CONC), FIG. 9c ISI(i), and FIG. 9d MSE(i).

FIG. 10 shows comparative results between the CMA equalizer and the concurrent equalizer (CONC) for channel M4, modulation 16-QAM ($\gamma$=1.32), SNR=35 dB, with parameters: $N_a$=30000, $\eta$=1×10$^{-3}$, $\eta_v$=1×10$^{-3}$, $\eta_w$=1×10$^{-2}$, L=$L_c$=16 and $\xi$=8, with FIG. 10a Γ(CMA), FIG. 10b Ψ(CONC), FIG. 10c ISI(i), and FIG. 10d MSE(i).

FIG. 11 shows comparative results between the CMA equalizer and the concurrent equalizer (CONC) for channel M4, modulation 64-QAM ($\gamma$=1.380953), SNR=35 dB, with parameters: $N_a$=30000, $\eta$=1×10$^{-3}$, $\eta_v$=1×10$^{-3}$, $\eta_w$=1 ×10$^{-2}$, L=$L_c$=16 and $\xi$=6, with FIG. 11a Γ(CMA), FIG. 11b Ψ(CONC), FIG. 11c ISI(i), and FIG. 11d MSE(i).

FIG. 14 shows comparative results between the CMA equalizer and the concurrent equalizer (CONC) for the channel specified in Table 4 with f=0 Hz, including the effect of raised-cosine filter, with FIG. 14a $y_{CMA}(n)$, FIG. 14b $y_{CONC}(n)$, FIG. 14c $MSE_{CMA}(n)$, and FIG. 14d $MSE_{CONC}(n)$.

FIG. 15 shows comparative results between the CMA equalizer and the concurrent equalizer (CONC) for the channel specified in Table 4 with f=10 Hz, including the effect of raised-cosine filter, with FIG. 15a $y_{CMA}(n)$, FIG. 15b $y_{CONC}(n)$, FIG. 15c $MSE_{CMA}(n)$, and FIG. 15d $MSE_{CONC}(n)$.

FIG. 16 shows comparative results between the CMA equalizer and the concurrent equalizer (CONC) for the channel specified in Table 4 with f=20 Hz, including the effect of raised-cosine filter, with FIG. 16a $y_{CMA}(n)$, FIG. 16b $y_{CONC}(n)$, FIG. 16c $MSE_{CMA}(n)$, and FIG. 16d $MSE_{CONC}(n)$.

FIG. 17 shows comparative results between the CMA equalizer and the concurrent equalizer (CONC) for the channel specified in Table 4 with f=50 Hz, including the effect of raised-cosine filter, with FIG. 17a $y_{CMA}(n)$, FIG. 17b $y_{CONC}(n)$, FIG. 17c $MSE_{CMA}(n)$, and FIG. 17d $MSE_{CONC}(n)$.

FIG. 18 shows comparative results between the CMA equalizer and the concurrent equalizer (CONC) for the channel specified in Table 4 with f=100 Hz, including the effect of raised-cosine filter, with FIG. 18a $y_{CMA}(n)$, FIG. 18b $y_{CONC}(n)$, FIG. 18c $MSE_{CMA}(n)$, and FIG. 18d $MSE_{CONC}(n)$.

DETAILED DESCRIPTION OF THE PREFERRED EMBODIMENTS

Definition of the Problem Whose Solution is Obtained by Means of the Concurrent Process for Blind Deconvolution of Digital Signals The solution for the problem of superposition of propagation rays and the dynamic variation in the transmission channel of a digital system will be one of the hardest challenges for the technological advancement in this area for the next few years. In mobile communications, this undesirable phenomena is characterized by the parameters delay spread, angle spread and Doppler spread, which determine the level and dynamics of superposition between the symbols of the system. Such symbol superposition occurs as a consequence of the transmission of information through the channel.

Particularly, the superposition of symbols occurs due to the dispersive nature of the transmission channel of any practical digital system, which implies in the impulsive response c(n) of the channel to assume non-null values along many sample intervals. John G. Proakis, Digital Communications, 3rd ed., McGraw-Hill, 1995. A non-dispersive channel presents a response c(n) to the impulse δ(n), characterized by a single $\delta(n-n_d)$ impulse that occurs in $n_d \geq 0$ sample instants after the initial instant.

The dispersion of the channel may be better understood from the point of view of the convolution (Robert D. Strum and Donald E. Kirk, First Principles of Discrete Systems and Digital Signal Processing, Addison-Wesley, 1989) between the sequence of symbols s(n) sent by the digital transmitter and the impulsive response c(n) of the channel. If the channel is non-dispersive (which is the ideal situation desired in practice, due to the high speed of transmission of the digital symbols of the current systems), then the symbol sequence u(n) received by the digital receiver will be a equal to s(n), except for a gain constant G and a delay $n_d \geq 0$, i.e., u(n)=G s(n-$n_d$). If the channel is dispersive, each sample of u(n) will be a weighted sum of the previous samples, which is defined by $c(n) \neq \delta(n-n_d)$.

This way, the channel dispersion may be associated with the concept of reverberation, since the value of each sample is interfered by "echoes" from previously occurred samples. From this fact we have the concept of the quantity denominated Inter Symbol Interference or ISI, whose value measures how much the symbols of a digital transmission system overlap each other due to the channel dispersion. John G. Proakis, Digital Communications, 3rd ed., McGraw-Hill, 1995; Simon Haykin, Adaptive Filter Theory, 3rd ed., Prentice Hall, Upper Saddle River, N.J., 1996.

Figure 1:
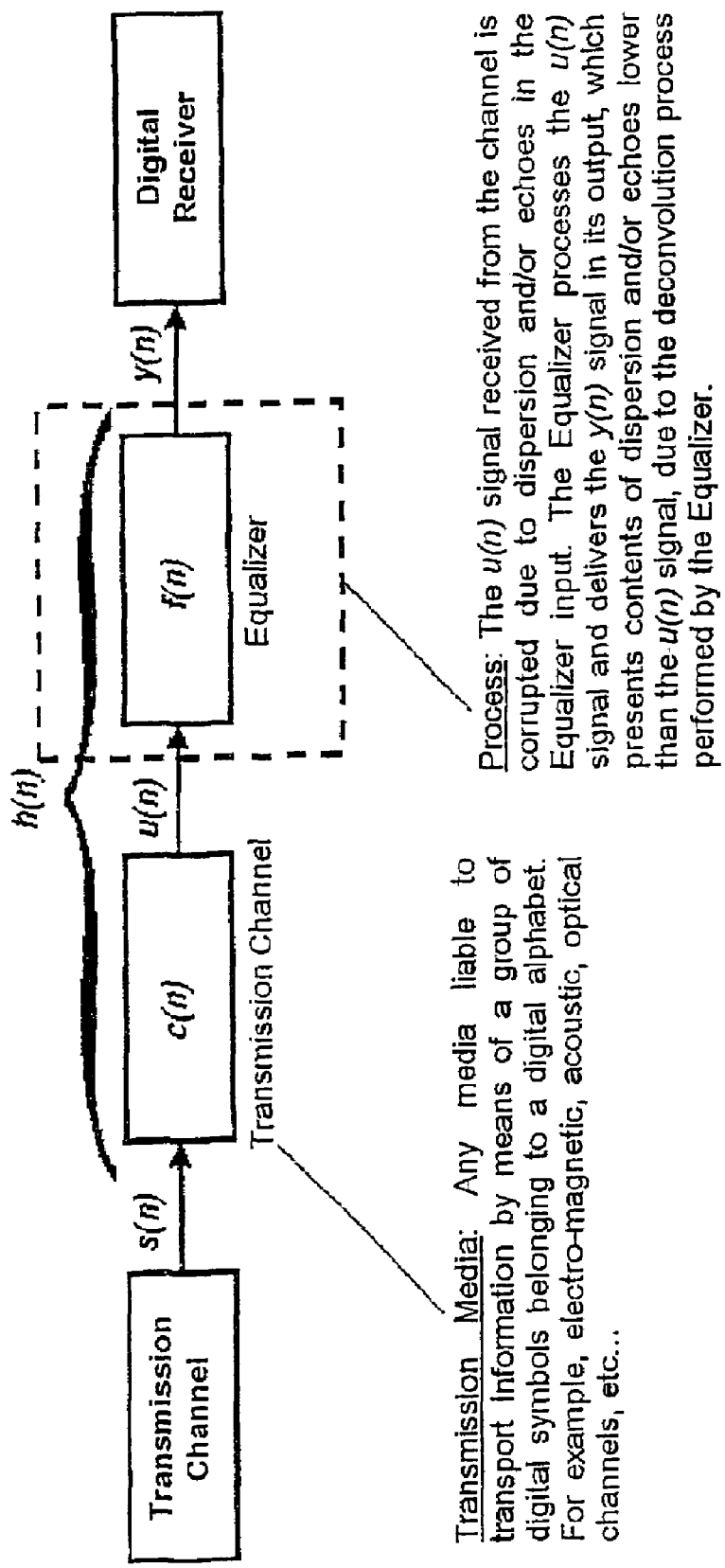
FIG. 1 shows a baseband representation of the removal process of the ISI by the concurrent equalizer in a digital transmission system.

As the reverberation is a natural and inevitable phenomena to all and any practical transmission channel, the scientific community has circumvented the problem by means of dispersion compensation systems denominated equalizers. Equalizers are usually placed between the digital receiver and the channel, so that the combined impulsive response h(n) of the equalizer in series with the channel tends to $\delta(n-n_d)$, and then avoiding the channel dispersion (John G. Proakis, Digital Communications, 3rd ed., McGraw-Hill, 1995). FIG. 1 shows the simplified diagram of the dispersion compensation process accomplished by the Equalizer.

In FIG. 1, note that h(n) is the result of the convolution of the channel impulsive response c(n) with the equalizer impulsive response f(n), i.e., h(n)=c(n)*f(n). Robert D. Strum and Donald E. Kirk, First Principles of Discrete Systems and Digital Signal Processing, Addison-Wesley, 1989. As the sequence of symbols y(n) received by the digital receiver is the result of the convolution of s(n) with h(n), and since the equalizer actuates in the process in order that h(n)→$\delta(n-n_d)$, the process of channel deconvolution—also called process of channel equalization (Robert D. Strum and Donald E. Kirk, First Principles of Discrete Systems and Digital Signal Processing, Addison-Wesley, 1989; Simon Haykin, Adaptive Filter Theory, 3rd ed., Prentice Hall, Upper Saddle River, N.J., 1996)—results in y(n)→s(n-$n_d$). That is, the deconvolution process performed by the equalizer causes the y(n), contrary to the u(n) signal received from the channel, to be a reply of the s(n) sequence originally transmitted, except for a delay of $n_d$ samples. Every time the deconvolution process reaches a stage in which h(n)→$\delta(n-n_d)$ it is said that the equalizer has reached the ZF (zero forcing) condition (or situation), when then, ISI→0. John G. Proakis, Digital Communications, 3rd ed., McGraw-Hill, 1995. In many practical situations, due to several factors, such as noises and characteristics specific to the channel, the ZF condition is not fully accomplished, but only approximated by the equalizer. One of these cases is that one in which the equalizer operates in a situation of MMSE (Minimum Mean Squared Error), which is not exactly the ZF situation, but for practical and operational purposes of an equalizer operating in this condition, it is a substitute situation.

Independently of the transmission channel media (electromagnetic, acoustic, etc.), due to the tendency of digital systems to transmit digital symbols at faster and faster speeds to meet market demands, the dispersion, even at low levels, is enough to deteriorate the system performance, because the duration interval of the symbols is short if compared to the duration interval of the dispersion. Another additional factor has recently appeared, complicating even more the advancement of digital communications: The telecommunication market has presented a high growth rate of demand for more complexity (and, therefore, volume) of information to be transmitted. The Cellular Telephony System of 3rd Generation based on the "software radio" concept (under development by several manufacturers, see European Commission DGXIII-B—Software Radio Technology http://www.de.infowin.org/ACTS/ANALYSYS/CONCERTATION/MOBIL- ITY/swr.htm) is a typical example of such demand. The fact is that this demand growth rate is a lot higher than the operation speed growth rate (clock) of the digital circuits that compose the digital system, and that speed is limited by the status of technological advance in the micro-electronics and semiconductors field. Also, it is important to point out that all these limiting factors occur in a context with little availability to allocate spectral bands, especially in low frequencies.

This way, in order to meet this higher demand for information volume, the solution found is to increase the "vocabulary" of digital symbols of a system (denominated constellation or system alphabet), so that the higher complexity of information may be offset by a better elaborated "vocabulary", capable to represent a maximum volume of information within the same time interval. That is, a denser constellation allows the transmission speed not to be reduced as a consequence of the higher complexity—i.e., entropy (John G. Proakis, Digital Communications, 3rd ed., McGraw-Hill, 1995; Simon Haykin, Adaptive Filter Theory, 3rd ed., Prentice Hall, Upper Saddle River, N.J., 1996)—of information, since the larger number of symbols available circumvents the need to issue many symbols in a row, a situation that would occur for a lesser dense constellation.

However, for the same number of "letters" available, a forcibly long "vocabulary" presents a larger number of "words" or symbols that are similar to each other than a simpler "vocabulary". This increased similarity between the constellation symbols of a digital system that uses a denser constellation turns into a serious problem for the system performance when the channel is dispersive. This is due to the fact that the minimum ISI makes the symbols unintelligible from the digital point of view, due to the increased intrinsic similarity between them. In technical terms, the distance that differs the symbols from each other becomes shorter, which hampers the identification of the symbol effectively received. This way, the performance of a channel equalizer of a digital system becomes the critical factor in the performance of the system as a whole.

It is important to point out that the emerging cellular wideband communications systems, such as the 3rd Generation systems, involve the use of smart antennas in radio-bases and, possibly, in receiver terminals. These smart antennas are controlled by digital processing algorithms, denominated "spatial-temporal" algorithms, which are essentially equivalent to the equalization algorithms referred to and/or described herein.

An equalizer is said to be blind when it performs the blind deconvolution of the channel, that is, when the equalizer totally discards the need of the receiver to recognize the s(n) sequence originally transmitted. On the opposite, non-blind equalizers need the s(n) sequence to be recognized in the receiver as a reference—at best for a short interval of time—so that the ZF, MMSE or other equivalent condition may be accomplished. The advantage of a blind equalizer over a non-blind one is, therefore, obvious from the point of view of the reduction of spectral band required.

The concurrent process for blind deconvolution of digital signals, objective of this invention, is implemented by means of a blind equalizer system whose architecture is characterized for being concurrent. Therefore, hereinafter, we will refer to the equalizer that implements the concurrent process for blind deconvolution of digital signals as "concurrent equalizer". The new and inedited architecture of the concurrent equalizer—and the operation mode intrinsic to this architecture—permits the efficient deconvolution of digital signals with much denser constellations than permitted by the types of blind equalizers usually employed in current digital systems. Furthermore, the concurrent equalizer permits the dynamic temporal variation in the channel, resulting, for example, from the relative displacement between digital transmitter and receiver, to be significantly higher than the maximum displacement speed usually permitted by other equalizers.

The Concurrent Equalizer

Figure 2:
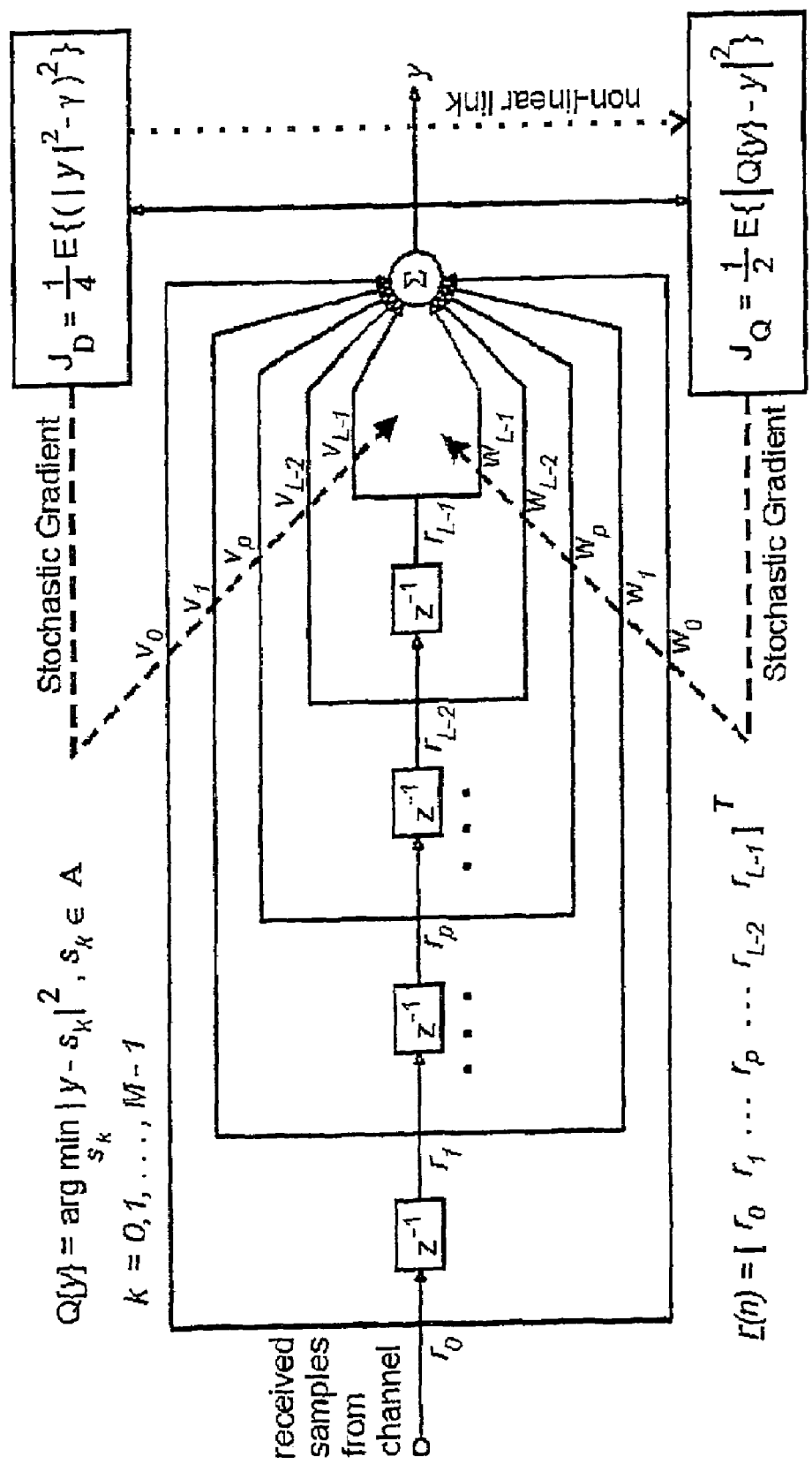
FIG. 2 shows a schematic diagram of the concurrent equalizer, which implements the concurrent process for blind deconvolution of digital signals, with each $z^{-1}$ block introducing the delay of a sample.

FIG. 2 shows the diagram for the concurrent equalizer. From its initialization, the vector with weights $\underline{V}=[V_0 \, V_1 \, \ldots \, V_{L-1}]^T$ is updated with some algorithm based on gradient methods, such as, for example, stochastic gradient (Simon Haykin, Adaptive Filter Theory, 3rd ed., Prentice Hall, Upper Saddle River, N.J., 1996), RLS (recursive least square) (Simon Haykin, Adaptive Filter Theory, 3rd ed., Prentice Hall, Upper Saddle River, N.J., 1996), or another equivalent, intending to minimize the cost function $J_D$, of another cost function that measures dispersion. Likewise, from its initialization, the vector with weights $\underline{W}=[W_0 \, W_1 \, \ldots \, W_{L-1}]^T$ is updated with some algorithm based on gradient methods, intending to minimize the cost function $J_Q$, or another that measures an output distance y from the equalizer to the nearest symbol in alphabet A, which is given by Q{y}. The operator Q{.} represents the quantization operation with reference to the symbols of alphabet A.

In FIG. 2 $\gamma=E\{|A|^4\}/E\{|A|^2\}$ is the statistic dispersion constant for a dispersion order of P=2. E{.} is the operator that returns the statistic average of the argument. The $\{.\}^T$ operator results in the transposition of the vector/matrix argument and the |.| operator returns the Euclidean rule of the argument. The $|.|^2$ operator was used as a distance metric, since the symbols s of alphabet A are usually complex numbers (when, for instance, the signaling is M-QAM, M-PSK (John G. Proakis, Digital Communications, 3rd ed., McGraw-Hill, 1995), etc.). Therefore, the computational cost of the $|.|^2$ operation is reduced with $|.|^2=s \cdot s^*$, where the $\{.\}^*$ operator represents the conjugation of the argument. However, any operator expressing the length—in the distance context—of the argument may be used. The gradient method shown in FIG. 2 is the stochastic gradient, but any equivalent method is liable to be employed.

Note that $J_D$ is a statistic dispersion of order P (Papoulis, Probability, Random Variables and Stochastic Processes, McGraw-Hill, 1965), which inherently uses higher order statistics from the equalizer output set y (J. P. LeBlanc, "Effects of Source Distributions and Correlation on Fractionally Spaced Blind Constant Modulus Algorithm Equalizers", Ph.D. Thesis, Cornell University, Ithaca, N.Y., USA, August 1995). Although the concurrent equalizer can operate for any internal value of P, for the sake of simplification of the following description, we will adopt P=2.

Note that $J_Q$ measures the square of the Euclidian rule between the equalizer output and the nearest alphabet symbol. Also, by the definition of the cost functions, note that if $J_Q$ is minimized, $J_D$ will simultaneously be minimized too. However, the reciprocal is not true.

In order to the minimization process of $J_Q$ does not destroy the stability of the delicate dynamics of the minimization process of $J_D$, for both share the same common variable y, a link is established between them, as demonstrated in FIG. 2. This link permits the process of $J_D$ to inform how balanced it is to the process of $J_Q$. The balance of the $J_D$ process must be understood not only associated with the stability concept, but also associated with the degree of the effect resulting from that stability, that is, the degree in which the minimization process of $J_D$ simultaneously minimizes $J_Q$, since the equalizer was developed to operated concurrently. This criteria is critical, since the minimization of $J_D$, for definition, not necessarily minimizes $J_Q$. This link consists of a non-linear operator that inhibits the $J_Q$ process when the minimization process of $J_D$ does not minimize $J_Q$ simultaneously. Thus, although they share the common output variable y—which makes the processes concurrent due to the resulting architecture—the $J_Q$ process can only interfere cooperatively with the minimization process of $J_D$.

Table 1 describes the general procedure adopted when the concurrent equalizer is applied to the equalization of a channel under T/2 fraction sampling (John G. Proakis, Digital Communications, 3rd ed., McGraw-Hill, 1995).

TABLE 1

Stage Procedure

Initialize vectors W and V:
W = 0 + J0 and $$V_k = \begin{cases} 0 + j0, k = 0, 1, \ldots L - 1, k \neq \xi \\ 1 + j0, k = \xi \end{cases}$$

where, $j = \sqrt{-1}$.

L is the dimension of vectors V and W (equalizer size) and $\xi$
$0 < \xi < L - 1$, is the index of the only weight of the V weight vectors to be initialized with the value $1 + j0$.
Initialize the index counter for the received samples by fractional sampling from channel i = 1
Initialize the channel regressor index counter (or instant/iteration index counter): n = 0
Obtain the $n^{th}$ channel regressor r(n) (J. P. LeBlanc, "Effects of Source Distributions and Correlation on Fractionally Spaced Blind Constant Modulus Algorithm Equalizers", Ph.D. Thesis, Cornell University, Ithaca, N.Y., USA, August 1995; John G. Proakis, Digital Communications, 3rd ed., McGraw-Hill, 1995; T. J. Endres, "Equalizing With Fractionally-Spaced Constant Modulus and Second-Order Statistics Blind Receivers", Ph.D. Thesis, Cornell University, Ithaca, N.Y., USA, May 1997):
$r_k(n) = u(L - 1 - k + i), k = 0, 1, \ldots, L - 1$
where, u is the sequence of samples received by fractional sampling $\frac{T}{2}$ from the channel, with $i = 1, 3, \ldots, N_a - 1$, varying as
$n = 0, 1, \ldots, N_r - 1$, and $N_a$ is the total number of samples to be received by fractional sampling from the channel, $$N_r = \left\lfloor \frac{N_a - L - 1}{2} \right\rfloor + 1$$

is the total number of regressors to be obtained from the channel and channel and T is the interval between the symbols generated in the transmitter. $\lfloor . \rfloor$ is the operator that results in the closest whole number minor than the argument.
Obtains the equalizer output at the instant n:
$y(n) = W^T(n) \cdot r(n) + V^T(n) \cdot r(n)$
Update V weight vector:
$V(n + 1) = V(n) + \bullet_v \cdot y(n)(\bullet - |y(n)|^2) \cdot r^*(n)$
where, $\eta_v$ is the adaptation step of vector V, $0 < \eta_v << 1.0$.
Update W weight vector:
$W(n + 1) = W(n) + \bullet_w [1 - D_Q(n)[Q\{y(n)\} - y(n)]r^*(n)$
where, $\eta_w$ is the adaptation step of vector W, $0 < \eta_w << 1.0$.

$$D_Q(n) = \begin{cases} 0, Q\{y(n)\} = Q\{\bar{y}(n)\} \\ 1, Q\{y(n)\} \neq Q\{\bar{y}(n)\} \end{cases}$$

controls the non-linear link of FIG. 2, where
$\bar{y}(n) = V^T(n + 1) \cdot r(n) + W^T(n) \cdot r(n)$
Increment index counters:
i = i + 2
n = n + 1

TABLE 1-continued

Stage Procedure

Test loop end:
If L + i > Na => END
Otherwise. repeat steps 4 to 9.

Table 1 is a general summary of operations performed by the concurrent equalizer to implement the concurrent process for blind deconvolution of digital signals when applied to the channel equalization, for P=2. Note that, in a continuous communication, the value of $N_a$ may be considered infinite.

From Table 1, note that factor $[1-D_Q]$ generates the following behavior during the operation of the concurrent equalizer: $\underline{W}$ can only be updated if, when updating $\underline{V}$, the output variable y remains in the same quantization level Q{y}. A quantization in V that does not change the quantization level Q implicitly means a probably correct updating, since this is the expected condition after the equalizer convergence. Therefore, factor $[1-D_Q]$ controls the updating of $\underline{W}$ pursuantly to the concurrent operation of the system: The minimization process of $J_Q$ is only activated when the minimization process of $J_D$ simultaneously minimizes $J_Q$. As the $\underline{W}$ and $\underline{V}$ filters jointly influence the output y, factor $[1-D_Q]$ avoids any non-cooperative interference of the minimization process of $J_Q$ that might unbalance the minimization process of $J_D$.

Comparative Tests Under Static Channel—Results Obtained

With the objective of testing the concurrent equalizer in situations as real as possible, we will use in this description models of channels available in the database of Rice University, in Houston, Tex., USA. This database is known as Signal Processing Information Base (SPIB) (SPIB—Signal Processing Information Base http://spib.rice.edu/spib/microwave.html, http://spib.rice.edu/spib/cable.html) and can be accessed at http://spib.rice.edu/. The SPIB has been widely used as a reference in many recent works that intend to avoid an exclusively academic focus. Additional information, including studies and articles based on SPIB can be found in the site of the Blind Equalization Research Group (BERG) (Blind Equalization Research Group—Cornell University—Ithaca, N.Y., USA http://backhoe.ee.cornell.edu/BERG/) at http:/backhoe.ee.cornell.edu/BERG/, which belongs to the Cornell University, in Ithaca, N.Y., USA. The operation of the concurrent equalizer under dynamic channel is described in Section 4.

The microwave channel models to be used may be accessed at http://spib.rice.edu/spib/microwave.html. These models constitute the impulse response of several real microwave channels obtained from field measurements. Although it is herein presented the complete characterization of each channel in time domain and also in frequency domain, additional information may be obtained in C. R. Johnson, Jr. et. al., "On Fractionally-Spaced Equalizer Design for Digital Microwave Radio Channels," Proc. of the 29th Asilomar Conference, Pacific Grove, Calif., November 1995; J. R. Treichler, I. Fijalkow, C. R. Johnson, Jr., "Fractionally Spaced Equalizers: How Long Should They Really Be?" IEEE Signal Processing Magazine, vol. 13, No. 3, pp. 65-81, May 1996; and T. J. Endres, S. D. Halford, C. R. Johnson, Jr., G. B. Giannakis, "Blind Adaptive Channel Equalization Using Fractionally-Spaced Receivers: A Comparison Study," Proc. Conf. on Info. Sciences and Systems, Princeton, N.J., March 1996.

The impulse response of the SPIB microwave channels is obtained under a high sampling rate, at the magnitude of tens of megabauds per second, resulting in impulsive responses with hundreds of samples. This allows each researcher to decimate the resulting sequence by a factor appropriate to its particular interest, without losing significant information. The great majority of the works rarely uses an impulsive response of channel with more than some tens of samples. In this description, in order to maintain a comparison term with recent works in the field (J. P. LeBlanc, "Effects of Source Distributions and Correlation on Fractionally Spaced Blind Constant Modulus Algorithm Equalizers", Ph.D. Thesis, Cornell University, Ithaca, N.Y., USA, August 1995; T. J. Endres, "Equalizing With Fractionally-Spaced Constant Modulus and Second-Order Statistics Blind Receivers", Ph.D. Thesis, Cornell University, Ithaca, N.Y., USA, May 1997; W. Chung, "Geometrical Understanding of the Constant Modulus Algorithm: Adaptive Blind Equalization and Cross-Polarized Source Separation", M.S. Thesis, Cornell University, Ithaca, N.Y., USA, May 1999), the SPIB microwave channels will be decimated to 16 samples. Table 2 identifies the SPIB channels used and establishes the respective designation to be adopted hereinafter. For example, references to channel M4 in this description must be understood as: the channel whose impulse response results in the decimation to 16 samples from the sample sequence of the file chan4.mat from the SPIB database, concerning microwave channels.

Another channel model used in this description is the representative of cable TV channels, which may be accessed at http://spib.rice.edu/spib/cable.html. The sampling rate used for these SPIB channels is the usually employed in practical cable TV decoders. This way, in order to maintain a comparison term with the works in the field, these channels will not be decimated. Table 3 identifies the cable TV channel SPIB to be used and establishes the respective designation to be adopted hereinafter. For example, references to channel C1 in this description must be understood as: the channel whose impulse response is given by the sequence of samples of the chan1.mat file of the SPIB database concerning cable TV channels.

TABLE 3

Model of cable TV channel from the SPIB database.

| SPIB File: (cable TV) | Number of sample sin the SPIB file, resulting from the fractional sampling T/2 of the impulsive response received from the channel: (according to http://spib.rice.edu/spib/cable.html.) | Designation in this description of the respective impulsive response associated. |
|---|---|---|
| Chan1.mat | 128 | C1 |

TABLE 2

Microwave channel models in the SPIB database.

| SPIB File: (microwaves) | Sampling rate 1/T of transmitter in Mbauds/s (according to http://spib.rice.edu/spib/microwave.html): | Number of samples in the SPIB file, resulting from the fractional sampling T/2 of impulsive response received from the channel: | Designation, in this description, of the respective impulsive response generated by decimation of the SPIB file to 16 samples: |
|---|---|---|---|
| chan4.mat | 30 | 300 | M4 |
| chan9.mat | 30 | 300 | M9 |
| chan14.mat | 30 | 600 | M14 |

In order not to change the location of the zeros of the FIR transfer function of a SPIB channel, the decimation is applied to the frequency domain. Robert D. Strum and Donald E. Kirk, First Principles of Discrete Systems and Digital Signal Processing, Addison-Wesley, 1989; T. J. Endres, "Equalizing With Fractionally-Spaced Constant Modulus and Second-Order Statistics Blind Receivers", Ph.D. Thesis, Cornell University, Ithaca, N.Y., USA, May 1997. Specifically, the number of samples in a SPIB file is extended to the next whole power of 2 plus the addition of null samples in sequence. Then, the FFT (Fast Fourier Transform) is applied on the extended sequence and the resulting sequence in the frequency domain is decimated to 16 samples. Next, the IFFT (Inverse Fast Fourier Transform) (Robert D. Strum and Donald E. Kirk, First Principles of Discrete Systems and Digital Signal Processing, Addison-Wesley, 1989) is applied over the decimated sequence in the frequency domain, resulting in a sequence of 16 samples in the time domain, corresponding to the decimated impulsive response. If the decimation in the time domain were used, aliasing effects would be generated (Robert D. Strum and Donald E. Kirk, First Principles of Discrete Systems and Digital Signal Processing, Addison-Wesley, 1989), changing, particularly, the position of reflected roods and roots close to the unitary circle in the frequency domain z, and then distorting the characteristics of the SPIB channels.

In this description, the channels M4, M9, M14 and C1 are characterized by:

1—Module $|c(n)|$ and phase $\angle c(n)$ (in degrees) of the impulsive response $c(n)$ resulting from the fractional sampling T/2 of the impulse response $c(t)$ of the channel.

2—The location in plane z of the zeros of the transfer function $C(z)$ of the channel.

3—The place in plane z of the zeros of the transfer functions $C^{EVEN}(z)$ and $C^{ODD}(z)$ of the sub-channels (fractional sampling T/2 implies odd and even sub-channels (J. P. LeBlanc, "Effects of Source Distributions and Correlation on Fractionally Spaced Blind Constant Modulus Algorithm Equalizers", Ph.D. Thesis, Cornell University, Ithaca, N.Y., USA, August 1995; T. J. Endres, "Equalizing With Fractionally-Spaced Constant Modulus and Second-Order Statistics Blind Receivers", Ph.D. Thesis, Cornell University, Ithaca, N.Y., USA, May 1997).

The concurrent equalizer performance evaluation will be done in reference with an equalizer type CMA (Constant Modulus Algorithm). John G. Proakis, Digital Communications, 3rd ed., McGraw-Hill, 1995; T. J. Endres, "Equalizing With Fractionally-Spaced Constant Modulus and Second-Order Statistics Blind Receivers", Ph.D. Thesis, Cornell University, Ithaca, N.Y., USA, May 1997. The CMA FIR transversal equalizer is perhaps the most widely used and tested in the implementation of the current blind equalizers (S. Haykin, Blind Deconvolution, Prentice-Hall, 1994), because, in practical systems, its performance has been reported to be superior to other blind equalizers currently in use (J. P. LeBlanc, "Effects of Source Distributions and Correlation on Fractionally Spaced Blind Constant Modulus Algorithm Equalizers", Ph.D. Thesis, Cornell University, Ithaca, N.Y., USA, August 1995; T. J. Endres, "Equalizing With Fractionally-Spaced Constant Modulus and Second-Order Statistics Blind Receivers", Ph.D. Thesis, Cornell University, Ithaca, N.Y., USA, May 1997). The performance criteria adopted are based on the following simulation results:

1—Graph of the constellation Γ at the output y of the CMA equalizer after convergence, having the constellation of the source alphabet A as reference, with A represented in the graph by the symbols "+".

2—Graph of the Ψ constellation in the output y of the concurrent equalizer after convergence, having the constellation of the source alphabet A as reference, with A represented in the graph by the symbols "+".

3—Comparative graph of ISI(i) curves for the two equalizers, i=0, 2, ..., $N_a$−1, where $N_a$ is the total number of samples received by fractional sampling T/2 from the channel, and ISI(i) is the "reverberation" measure in the equalized signal y in instant i, obtained from $$ISI = \left[\sum_k |H_k| - \max_k |H_k|\right] / \max_k |H_k|$$

calculated for this instant. $H_k$ represents the $k^{th}$ component of vector H, which contains the coefficients of the impulse response h(n), combined with the equalizer and the channel.

4—Comparative graph of MSE(i) curves for the two equalizers, i=0, 2, ... $N_a$−1, where, MSE(i) is the mean square error between the equalized output y and the original sequence transmitted s, taking into consideration for the average the interval of samples that includes the instant i and the L+$L_c$−1 samples previous to it. $L_c$ is the dimension of channel dispersion defined by the number of non-null samples in the impulse response c(n) of the channel. Additionally, this graph demonstrates the horizontal line NT, which defines the maximum permitted MSE level, so that the transference to the renowned DD equalizer (Direct Decision) (John G. Proakis, Digital Communications, 3rd ed., McGraw-Hill, 1995; J. P. LeBlanc, "Effects of Source Distributions and Correlation on Fractionally Spaced Blind Constant Modulus Algorithm Equalizers", Ph.D. Thesis, Cornell University, Ithaca, N.Y., USA, August 1995; T. J. Endres, "Equalizing With Fractionally-Spaced Constant Modulus and Second-Order Statistics Blind Receivers", Ph.D. Thesis, Cornell University, Ithaca, N.Y., USA, May 1997) be done. The DD equalizer acts after the convergence of the CMA equalizer, intending to reduce its residual MSE (steady state MSE). However, the DD equalizer can only converge if the steady state MSE of the CMA equalizer has reached a value inferior to the indicated by the horizontal line NT (T. J. Endres, "Equalizing With Fractionally-Spaced Constant Modulus and Second-Order Statistics Blind Receivers", Ph.D. Thesis, Cornell University, Ithaca, N.Y., USA, May 1997).

The sequence representing the information source s to be transmitted through the channel has average zero, unit variance, uniform distribution, and presents statistic independence between samples.

The noise added to the equalizer input is Gaussian, with zero average, spectrally white and with variance defined by SNR (Signal To Noise Ratio). John G. Proakis, Digital Communications, 3rd ed., McGraw-Hill, 1995.

Some authors suggest that the dimension of equalizer L be done larger than the dimension of the channel dispersion $L_c$, so that the extra degrees of freedom so obtained allow the minimization of the equalizer noise gain (K. Abed-Merain, P. Duhamel, D. Gesbert, P. Loubaton, S. Mayrargue, E. Moulines e D. Slock, "Prediction Error Methods for Time-Domain Blind Identification of Multichannel FIR Filters", Proc. International Conference on Acoustics, Speech and Signal Processing, pp. 1968-1971, Detroit, USA, May 1995). However, in order to minimize the hardware cost for implementation purposes, we will adopt L=$L_c$ in the following simulations.

The initialization of the vector that defines the filter of the CMA equalizer and the vector V of the concurrent equalizer follows the strategy denominated single spike (T. J. Endres, "Equalizing With Fractionally-Spaced Constant Modulus and Second-Order Statistics Blind Receivers", Ph.D. Thesis, Cornell University, Ithaca, N.Y., USA, May 1997), which consists of initializing the vectors with 1+j0 in position ξ, 0<ξ<l−1, maintaining elements in other position null. In T. J. Endres, "Equalizing With Fractionally-Spaced Constant Modulus and Second-Order Statistics Blind Receivers", Ph.D. Thesis, Cornell University, Ithaca, N.Y., USA, May 1997, it is demonstrated that the optimal value of ξ depends on the position of the sample with maximum absolute value in the channel impulse response |c(n)| sequence, denominated channel cursor. However, as c(n) is not known at first, the universally accepted practice is to make ξ=L/2. If the equalized does not converge with ξ=L/2, it is normal that the receiver system tries to make a few attempts around ξ=L/2 until the equalizer converges, that is, ξ=L/2±λ, λ=1, 2, ... (Simon Haykin, Unsupervised Adaptive Filtering, Wiley, N.Y., 1999). We will adopt such heuristic in case of initial convergence failure. The cases for which it was necessary to apply it can be identified by ξ≠L/2.

The adaptation step of the CMA equalizer filter is η, and the adaptation steps of the concurrent equalizer filters are $η_v$ and $η_w$. These parameters are experimentally adjusted in order to meet the tradeoff between fast convergence and low steady state MSE.

With unitary variance in the information source s, for 16-QAM and 64-QAM, η presents better results in the neighborhood of value 1×10⁻¹, and for 256-QAM, in the neighborhood of 1×10⁻⁴. These results agree with the experiments involving 16-QAM and 256-QAM modulation in T. J. Endres, "Equalizing With Fractionally-Spaced Constant Modulus and Second-Order Statistics Blind Receivers", Ph.D. Thesis, Cornell University, Ithaca, N.Y., USA, May 1997.

In the following graphs (FIGS. 7-11), the following events are considered indication of good performance:

1—The degree in which the points of the output constellation y of the equalizer (Γ or Ψ) concentrate around the + symbols of alphabet A. Under ideal performance, this graph would show all the output points y projected in the intersection of the lines that define the + symbols and the alphabet A.

2—The rate at which the curve ISI(i) decreases with i and how low and invariable is the value of ISI(i) after convergence (steady state ISI).

3—The rate at which the curve MSE(i) decreases with i and how low and invariable is the value of MSE(i) after convergence (steady state MSE).

Below (FIGS. 7-11) are the results of the simulations which assess the comparative performance between the CMA equalizer and the concurrent equalizer.

Modulation 16-QAM SNR=35 dB—Channel M14.

FIG. 7 shows comparative results between the CMA equalizer and the concurrent equalizer (CONC) for channel M14, modulation 16-QAM ($\gamma$=1.32), SNR=35 dB. Parameters: $N_a$=100000, $\eta$=1×10$^{-3}$, $\eta_v$=1×10$^{-3}$, $\eta_w$=1×10$^{-2}$, $L=L_c$=16 and $\xi$=6. Modulation 64-QAM SNR=35 dB—Channel M9.

Modulation 64-QAM SNR=35 dB—Channel M9.

FIG. 8 shows comparative results between the CMA equalizer and the concurrent equalizer (CONC) for channel M9, modulation 64-QAM ($\gamma$=1.380953), SNR=35 dB. Parameters: $N_a$=100000, $\eta$=1×10$^{-3}$, $\eta_v$=1×10$^{-3}$, $\eta_w$=1×10$^{-3}$, $L=L_c$=16 and $\xi$=2.

Modulation 256-QAM SNR=35 dB—Channel C1.

FIG. 9 shows comparative results between the CMA equalizer and the concurrent equalizer (CONC) for channel C1, modulation 256-QAM ($\gamma$=1.395295), SNR=35 dB. Parameters: $N_a$=100000, $\eta$=1×10$^{-4}$, $\eta_v$=1×10$^{-4}$, $\eta_w$=1×10$^{-3}$, $L=L_c$=16 and $\xi$=63.

Modulation 16-QAM SNR=35 dB—Channel M4.

FIG. 10 shows comparative results between the CMA equalizer and the concurrent equalizer (CONC) for channel M4, modulation 16-QAM ($\gamma$=1.32), SNR=35 dB. Parameters: $N_a$=30000, $\eta$=1×10$^{-3}$, $\eta_v$=1×10$^{-3}$, $\eta_w$=1×10$^{-2}$, $L=L_c$=16 and $\xi$=8.

Modulation 64-QAM SNR=35 dB—Channel M4.

FIG. 11 shows comparative results between the CMA equalizer and the concurrent equalizer (CONC) for channel M4, modulation 64-QAM ($\gamma$=1.380953), SNR=35 dB. Parameters: $N_a$=30000, $\eta$=1×10$^{-3}$, $\eta_v$=1×10$^{-3}$, $\eta_w$=1×10$^{-2}$, $L=L_c$=16 and $\xi$=6.

Note that, in none of the first three examples shown (FIGS. 7, 8 and 9), the CMA equalizer reaches a MSE low enough so that the transference to the DD equalizer is successfully accomplished. These are typical cases in which the popular and renowned CMA-DD equalizer would fail in meeting its objective. For the three examples, the concurrent equalizer not only has surpassed the MSE level for transference, but also reached a MSE level much inferior and less variable than the CMA equalizer. The same observation is valid for the comparative ISI between the equalizers.

The concurrent equalizer outperforms the CMA equalizer, even in those situations in which the CMA reaches the transference MSE, such as demonstrated, for example, in FIG. 10 for modulation 16-QAM. Note also that for the same channel and modulation 64-QAM, the CMA equalizer reaches only a marginal steady state MSE, as shown in FIG. 11.

Note that in the examples for which the channel rotates the received constellation, the concurrent equalizer is capable to correct this undesirable effect, while the CMA equalizer does not have this capability. This is a particularity of the concurrent equalizer, which allows the simplification of the synchronism system. It is important to point out that, upon performing joint equalization with carrier phase retrieval and/or symbol sampling instant retrieval, the concurrent equalizer presents an inertia and a response time shorter than those of the CMA equalizer followed by a phase corrector (de-spinner). This is a decisive characteristic for the good performance of the concurrent equalizer in time varying channels.

It is important to reaffirm that the concurrent equalizer surpasses the performance of the CMA equalizer, not only regarding the MSE, but also the ISI. In all cases, the concurrent equalizer quickly reached a much lower and more stable ISI level than CMA equalizer. This behavior of the concurrent equalizer demonstrates that its best performance compared to the CMA equalizer does not depend on the phase rotation imposed by the channel to the constellation received, since the ISI is defined from the module of the impulse response h(n). If, in the examples above, a system to correct the phase rotation on the received constellation were previously added to both equalizers, the performance of CMA equalizer would not be changed regarding the ISI due to the phase invariance of this equalizer (T. J. Endres, "Equalizing With Fractionally-Spaced Constant Modulus and Second-Order Statistics Blind Receivers", Ph.D. Thesis, Cornell University, Ithaca, N.Y., USA, May 1997), while, on the other hand, the performance of the concurrent equalizer would tend to improve.

Comparative Tests Under Dynamic Channel—Results Obtained

In the following simulation set, the performance of the concurrent equalizer is evaluated against the CMA equalizer, both operating under temporal variation in the channel, situation which characterizes the operation under dynamic channel.

The objective is to determine the sensibility of both equalizers to the speed of variation in the channel. To do so, the following analysis is based on the channels suggested by M. Gosh (M. Gosh, "Blind Decision Feedback Equalization for Terrestrial Television Receivers", Proceedings of IEEE, vol. 86, no. 10, pp. 2070-2081, October 1998), whose work referred to herein studies the digital television system ATSC 8-VSB proposed by the Advanced Television Systems Committee (ATSC Standard A/53, ATSC Digital Television Standard) for the equalization performance.

The ATSC 8-VSB digital system was proposed in the USA in 1993, with the objective to substitute the veteran NTSC analog system for television broadcast. Using the same channel with the 6 MHz bandwidth of the NTSC system, the ATSC 8-VSB was conceived to present a superior performance, even under high levels of interference, noise and multi-path effects (ATSC Document A/54, Guide to the Use of the ATSC Digital Television Standard).

Since this description considers all signals as baseband signals (John G. Proakis, Digital Communications, 3rd ed., McGraw-Hill, 1995), for the sake of this simulation, it is enough to use as information source s the 8-VSB alphabet generator A={-1.53, -1.09, -0.66, -0.22, 0.22, 0.66, 1.09, 1.53} to represent the eight possible signal amplitudes (8-PAM) baseband generated by a 8-VSB transmitter. Since the channel encoder of a ATSC 8-VSB transmitter "randomizes" with uniform distribution the baseband signal for transmission efficiency purposes (F. C. C. De Castro, M. C. F. De Castro, M. A. C. Fernandes and D. S. Arantes, "8-VSB Channel Coding Analysis for DTV Broadcast", IEEE Transactions on Consumer Electronics, vol. 46, no. 3, pp. 539-547, August 2000), the source s presents a uniform probabilistic distribution with statistic independence between samples. Note also, from the definition of alphabet A, that the variance of s is unitary. The unitary variance is assumed for s as partial representation of the CAG system effect present in any digital system.

The dynamic channel model adopted in this study is the one suggested in M. Gosh, "Blind Decision Feedback Equalization for Terrestrial Television Receivers", Proceedings of IEEE, vol. 86, no. 10, pp. 2070-2081, October 1998, and is specified in Table 4.

TABLE 4

| Components of the Signal Received | Amplitude | Delay [μs] | Delay [samples] |
|---|---|---|---|
| Principal Ray: | 1.000 | 0.00 | 39 |
| Echo 1: | 0.100 | −1.80 | 0 |
| Echo 2: | 0.100 | 0.15 | 42 |
| Echo 3: | $0.316 \sin\left(2\pi n \frac{f}{F_w}\right)$, $f > 0$ <br> 0.316, $f = 0$ | 1.80 | 77 |
| Echo 4: | 0.200 | 5.70 | 1b1 |
| Echo 5: | 0.126 | 18.0 | 426 |

Table 4: Specification of the dynamic channel mode adopted. The column "Delay [samples]" is obtained by dividing the values in column "Delay [μs]" by the fractional sampling interval T/2 of the receiver, where $1/T=F_s=10.76$ MHz is the sampling rate of the symbols in the ATSC 8-VSB transmitter (ATSC Document A/54, Guide to the Use of the ATSC Digital Television Standard; ATSC Standard A/53, ATSC Digital Television Standard), considering as a sample of index 0 the one with lower delay. The integer variable n represents the index of the $n^{th}$ channel regressor received, or the index of the $n^{th}$ symbol sent by the transmitter and, therefore, presents temporal spacing T associated to the interval between the indexed samples. The real constant f represents the speed of temporal variation for each type of dynamic channel to be considered. For example, 0.05 Hz<f<0.5 Hz models dynamic channels resulting from the reflection of signals by a tall building whose structure is swaying in its natural frequency of mechanical oscillation (due to the wind, etc.), and 2 Hz<f<5 Hz models channels with rapid and periodic fading (flutter) generated by the reflection of the signal by aircrafts flying in low altitude (M. Gosh, "Blind Decision Feedback Equalization for Terrestrial Television Receivers", Proceedings of IEEE, vol. 86, no.10, pp. 2070-2081, October 1998).

Therefore, from Table 4, the impulsive response obtained by fractional sampling T/2 of the dynamic channel in question has its representation in the z domain given by:

$$C(z) = 0.1 + 1.0z^{-39} + 0.1z^{-42} + \quad (1)$$
$$0.316\sin\left(2\pi n \frac{f}{F_s}\right)z^{-\pi} + 0.2z^{-161} + 0.126z^{-426}.$$

The ATSC 8-VSB system includes a baseband filter (Nyquist filter) of the raised-cosine type, with a roll-off of 11.5% (ATSC Standard A/53, ATSC Digital Television Standard; M. Gosh, "Blind Decision Feedback Equalization for Terrestrial Television Receivers", Proceedings of IEEE, vol. 86, no. 10, pp. 2070-2081, October 1998). As this filter affects the baseband signal, the channel model to be considered must include the effect of this filter in the performance evaluation of the equalizer. The raised-cosine filter of the ATSC 8-VSB system is an analog filter that presents a transfer function H(f), according to FIG. 12.

Figure 12:
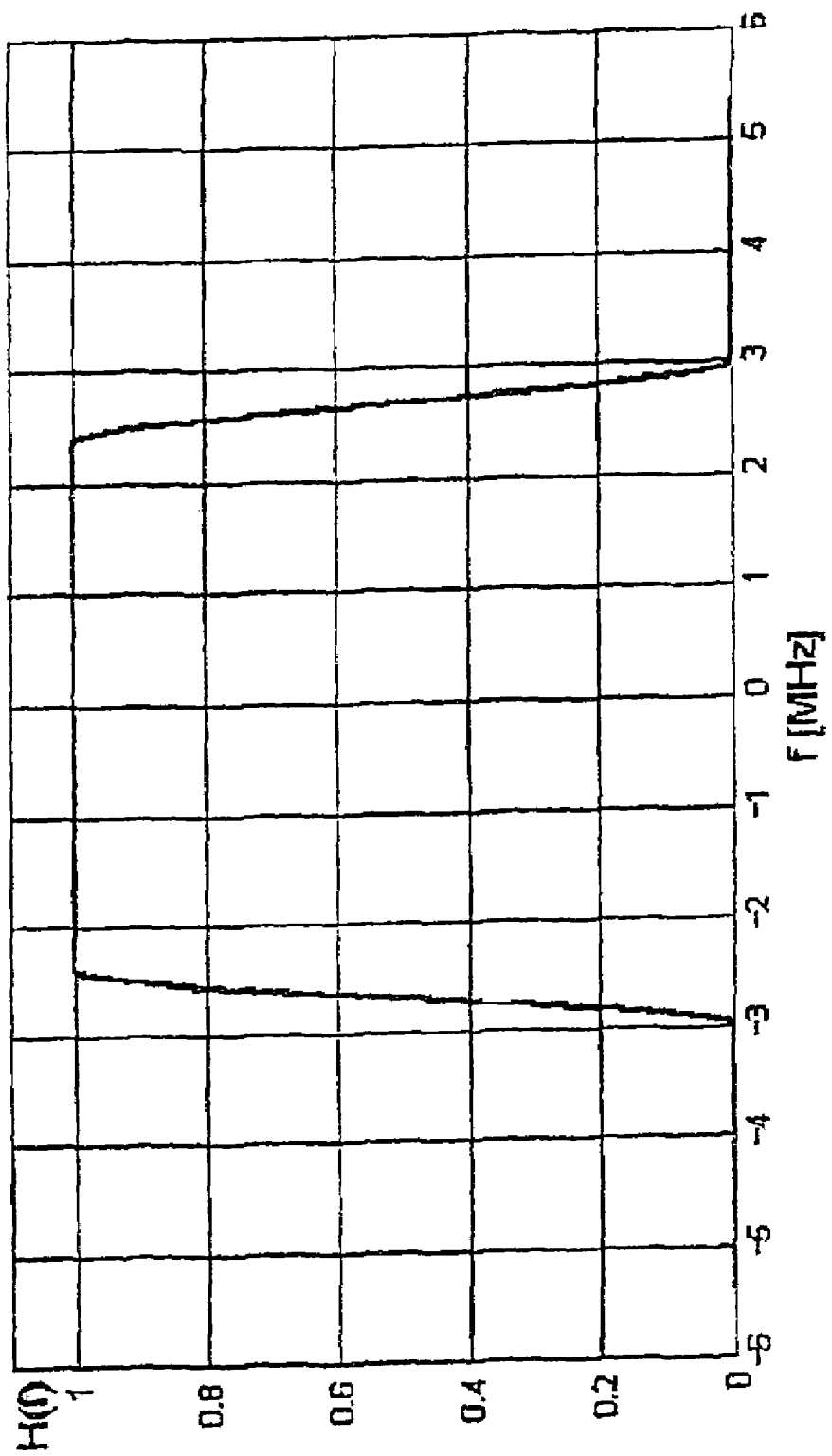
FIG. 12 shows a graphic representation of the transference function H(f) of the raised-cosine filter of the ATSC 8-VSB system.

FIG. 12 shows a graphic representation of the transference function H(f) of the raised-cosine filter of the ATSC 8-VSB system.

Figure 13:
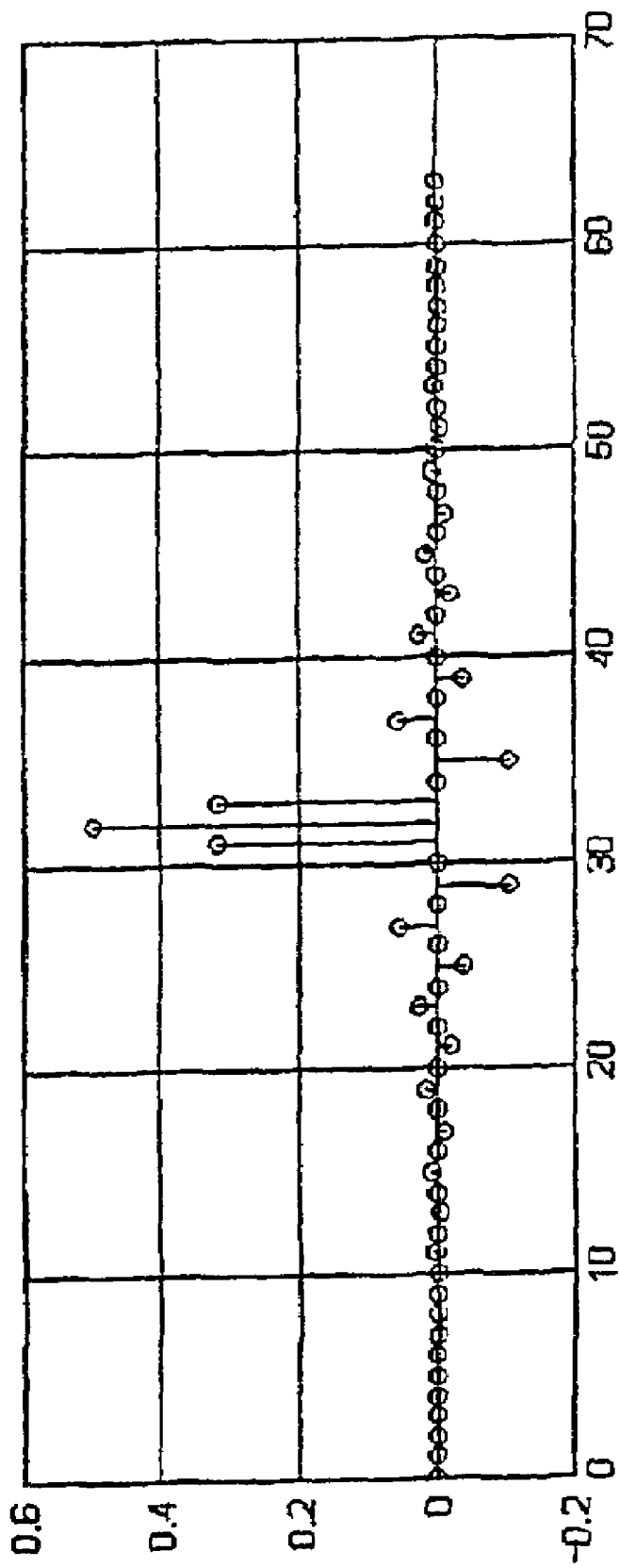
FIG. 13 shows a graph of $h_{rc}(i)$ for N=64 and $\alpha$=0.115.

The discrete impulsive response obtained by fractional sampling T/2 of the continuous impulsive response of the analog filter defined by the graph of FIG. 12 is given by Equation (2) and is graphically represented in FIG. 13.

$$h_{\infty}(i) = \frac{1}{2}\mathrm{sinc}\left(\frac{\pi\left(i-\frac{N}{2}\right)}{2}\right)\left[\frac{\cos\left(\frac{\alpha\pi\left(i-\frac{N}{2}\right)}{2}\right)}{1-\left(\alpha\left(i-\frac{N}{2}\right)\right)}\right], i = 0, 1, \ldots, N-1 \quad (2)$$

In the Equation (2) N=64 is the number of samples considered in this study for the impulsive response $h_{rc}(i)$, and α=0.115 is the parameter that defines the 11.5% roll-off of the filter in the frequency domain. The integer variable i represents the index of the $i^{th}$ sample received from the channel and, therefore, presents temporal spacing T/2 associated with the interval between the indexed samples.

In the following simulation set (FIGS. 14-18), the effect of the raised-cosine filter is included by effecting the convolution of the impulsive response of the channel defined by Equation (1) with the impulsive response of the raised-cosine filter given by Equation (2). Therefore, the dimension $L_c$ of the global channel dispersion ? including the effect of the raised-cosine filter ? is given by the sum of the dimension of channel dispersion with the dimension N of the filter dispersion, that is, $L_c$=427+64=491.

The performance criteria adopted are based on the following simulation results:

1—Graph of the CMA equalizer output $y_{CMA}(n)$, where n is the index of the $n^{th}$ channel regressor received, having the source alphabet constellation A as reference. A is represented in the graph by the set of dashed lines.

2—Graph of the concurrent equalizer output $y_{CONC}(n)$, having the source alphabet constellation A as reference. A is represented in the graph by the set of dashed lines.

3—Graph of the $MSE_{CMA}(n)$ curve of the CMA equalizer, with $MSE_{CMA}(n)$ being the mean square error between the $y_{CMA}(n)$ output and $Q\{y_{CMA}(n)\}$, $Q\{.\}$ is the operator that represents the 8-VSB quantizer. The averaging interval for the $MSE_{CMA}(n)$ includes the instant n and the previous $L_c$−1 samples. Additionally, this graph shows the horizontal line NT that defines the maximum permitted MSE level, so that the transference to the DD equalizer be possible.

4—Graph of the $MSE_{CONC}(n)$ curve of the concurrent equalizer, with $MSE_{CONC}(n)$ being the mean square error between the $y_{CONC}(n)$ output and $Q\{y_{CONC}(n)\}$. The averaging interval for the $MSE_{CONC}(n)$ includes the instant n and the previous $L_c$−1 samples. Additionally, this graph shows the horizontal line NT that defines the maximum permitted MSE level, so that the transference to the DD equalizer be possible.

A SNR=100 dB was adopted, since the objective is to measure the sensibility of the equalizer to the channel variations, and not the sensibility to the noise. As the channel varies, it was considered reasonable to adopt a dimension of the equalizer L that exceeds in 50% the dimension $L_c$=491 of the global channel dispersion, that is, it was adopted L=738. The initialization of vector V, both for the CMA equalizer and the concurrent equalizer, follows the usual technique single spike, which, in this simulation, consists of initializing V with the value 1.0 in position •=65, maintaining null the elements in the other positions. The adaptation steps were fixed in $\bullet=2\times10^{-4}$ for the CMA equalizer and $\bullet_v=2\times10^{-4}$ and $\bullet_w=2\times10^{-3}$ for the concurrent equalizer.

Below (FIGS. 14-18) are the simulations of the comparative performance between the CMA equalizer and the concurrent equalizer, both operating under dynamic channel for variation speeds f=0 Hz (static channel), f=10 Hz, f=20 Hz, f=50 Hz and f=100 Hz.

The experimental results under dynamic channel operation demonstrate that the concurrent equalizer presents a performance superior to the CMA equalizer in the task to deconvolve channels that present rapid temporal variations.

Note that, opposite to the concurrent equalizer, for f=50 Hz and f=100 Hz the CMA equalizer cannot reach and maintain the MSE lever required for the transference to the DD equalizer. Note also that, for all cases, the MSE regime level reached by the concurrent equalizer is much lower and more invariable when compared to the level accomplished by the CMA equalizer.

These results suggest that the concurrent equalizer will be able to largely contribute for the performance improvement of mobile digital systems.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A method for blind deconvolution of a digital signal comprising the steps of:
    submitting said digital signal concurrently to an adaptive filter V and to an adaptive filter W, each of the adaptive filters having coefficients and outputs;
    updating the coefficients of said adaptive filter W according to the coefficients of said adaptive filter V by means of a non-linear function; and
    adding the outputs of said adaptive filters V and W, so as to generate a resulting output signal.

2. A method according to claim 1, wherein the coefficients of said adaptive filter V are adjusted by gradient methods or equivalent methods, based on the minimization of a cost function that measures a statistic dispersion of said output signal.

3. A method according to claim 1, wherein the coefficients of said adaptive filter W are adjusted by gradient methods or equivalent methods, based on the minimization of a cost function that measures a distance from said output signal to a nearest digital alphabet symbol.

4. A system for blind deconvolution of a digital signal, comprising:
    means for submitting a digital signal concurrently to an adaptive filter V and to an adaptive filter W, each of the adaptive filters having coefficients and outputs;
    means for updating the coefficients of said adaptive filter W according to the coefficients of said adaptive filter V by means of a non-linear function; and
    means for adding the outputs of said adaptive filters V and W, so as to generate a resulting output signal.

5. A system according to claim 4, wherein said adaptive filter V is different from said adaptive filter W and said blind deconvolution occurs by means of concurrent action of at least said different adaptive filters V and W, the output signals of said at least said adaptive filters V and W jointly defining the output signal of said deconvolution system.

6. A system according to claim 4, wherein the coefficients of at least one of said adaptive filters V and W are adjusted by gradient methods or equivalent methods, based on minimization of a cost function that measures a statistic dispersion of the output signal of said system.

7. A system according to claim 4, wherein the coefficients of at least one of said adaptive filters V and W are adjusted by gradient methods or equivalent methods, based on minimization of a cost function that measures a distance from the output signal of said system to a nearest digital alphabet symbol.

* * * * *